(12) United States Patent
Okuda et al.

(10) Patent No.: US 9,286,839 B2
(45) Date of Patent: Mar. 15, 2016

(54) IMAGE PROCESSOR, IMAGE PROCESSING METHOD, IMAGE ENCODER, IMAGE ENCODING METHOD, AND IMAGE DISPLAY DEVICE

(75) Inventors: Noritaka Okuda, Tokyo (JP); Jun Someya, Tokyo (JP); Hideki Yoshii, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 2090 days.

(21) Appl. No.: 11/883,228

(22) PCT Filed: Jul. 26, 2005

(86) PCT No.: PCT/JP2005/013612
§ 371 (c)(1),
(2), (4) Date: Oct. 22, 2007

(87) PCT Pub. No.: WO2006/080102
PCT Pub. Date: Aug. 3, 2006

(65) Prior Publication Data
US 2008/0165105 A1 Jul. 10, 2008

(30) Foreign Application Priority Data
Jan. 28, 2005 (JP) .................................. 2005-021162

(51) Int. Cl.
G09G 3/36 (2006.01)
H04N 19/176 (2014.01)
H04N 19/124 (2014.01)
H04N 19/14 (2014.01)

(52) U.S. Cl.
CPC ........... *G09G 3/3611* (2013.01); *H04N 19/124* (2014.11); *H04N 19/14* (2014.11); *H04N 19/176* (2014.11); *G09G 3/3607* (2013.01); *G09G 2320/0252* (2013.01); *G09G 2340/02* (2013.01); *G09G 2340/16* (2013.01); *G09G 2360/16* (2013.01)

(58) Field of Classification Search
USPC ............................................... 345/89, 55, 204
See application file for complete search history.

(56) References Cited

U.S. PATENT DOCUMENTS

| | | | |
|---|---|---|---|
| 4,710,811 A | 12/1987 | Kondo | |
| 5,627,581 A * | 5/1997 | Kondo | ........................ 348/14.13 |
| 5,906,880 A * | 5/1999 | Chiba et al. | .................... 428/828 |
| 6,549,672 B1 * | 4/2003 | Kondo et al. | ................. 382/239 |
| 6,756,955 B2 | 6/2004 | Someya et al. | |
| 7,034,788 B2 | 4/2006 | Someya et al. | |
| 2003/0231158 A1 | 12/2003 | Someya et al. | |
| 2004/0189565 A1 | 9/2004 | Someya | |

FOREIGN PATENT DOCUMENTS

| | | |
|---|---|---|
| JP | 61147689 A | 7/1986 |
| JP | 6-121295 A | 4/1994 |
| JP | 6-189232 A | 7/1994 |
| JP | 2616652 B2 | 3/1997 |
| JP | 2001-258035 A | 9/2001 |
| JP | 2004-163842 A | 6/2004 |

* cited by examiner

*Primary Examiner* — William Boddie
*Assistant Examiner* — Leonid Shapiro
(74) *Attorney, Agent, or Firm* — Birch, Stewart, Kolasch & Birch, LLP

(57) ABSTRACT

In the image processors and the image processing methods of the present invention, the number of bits for quantizing image data is adjusted on the basis of a dynamic range of each block. Therefore, the error introduced by encoding is reduced without increasing the data amount of the encoded image data, and the response speed of a liquid crystal can be controlled appropriately by preventing unnecessary voltages from being applied due to the error introduced by encoding.

4 Claims, 28 Drawing Sheets

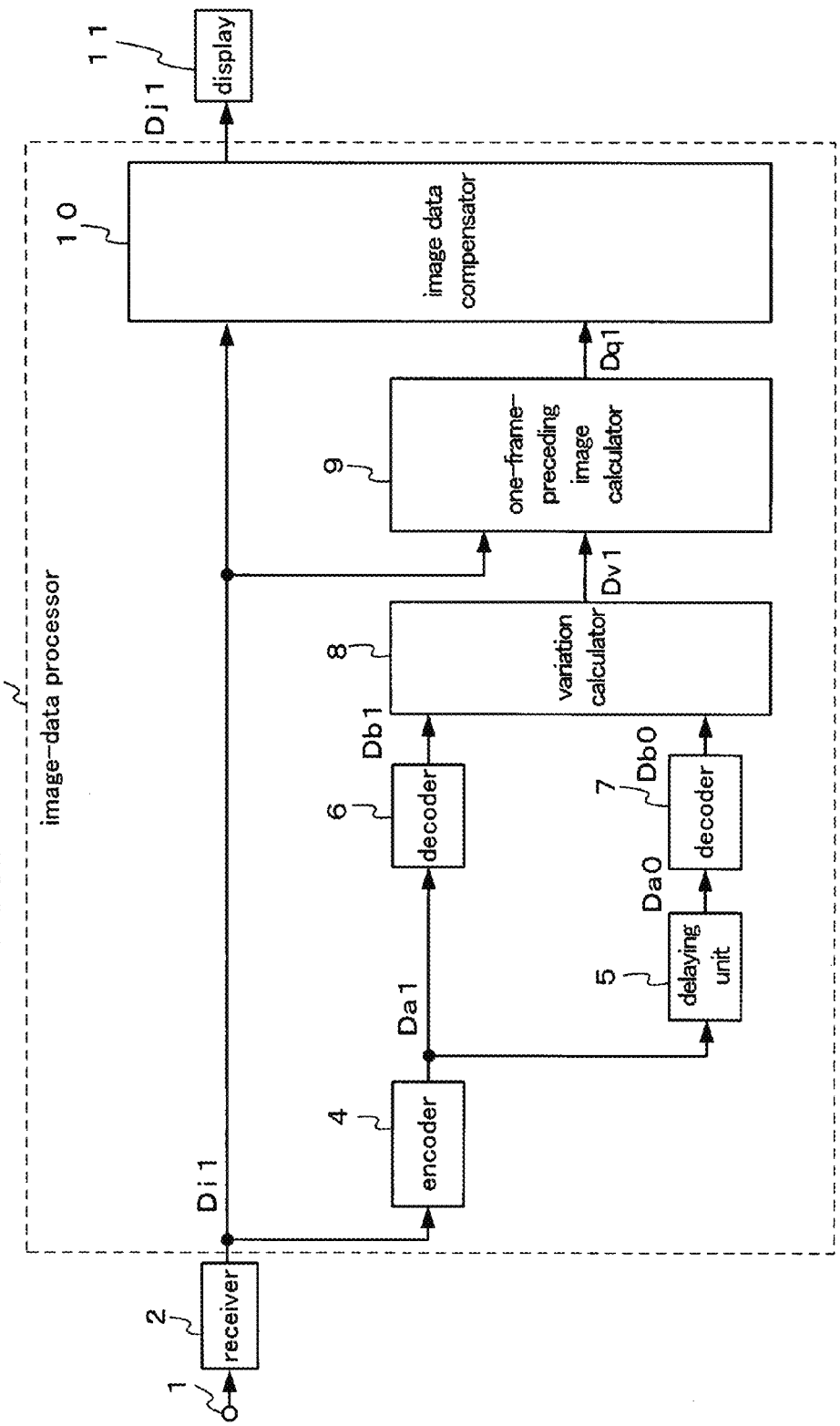

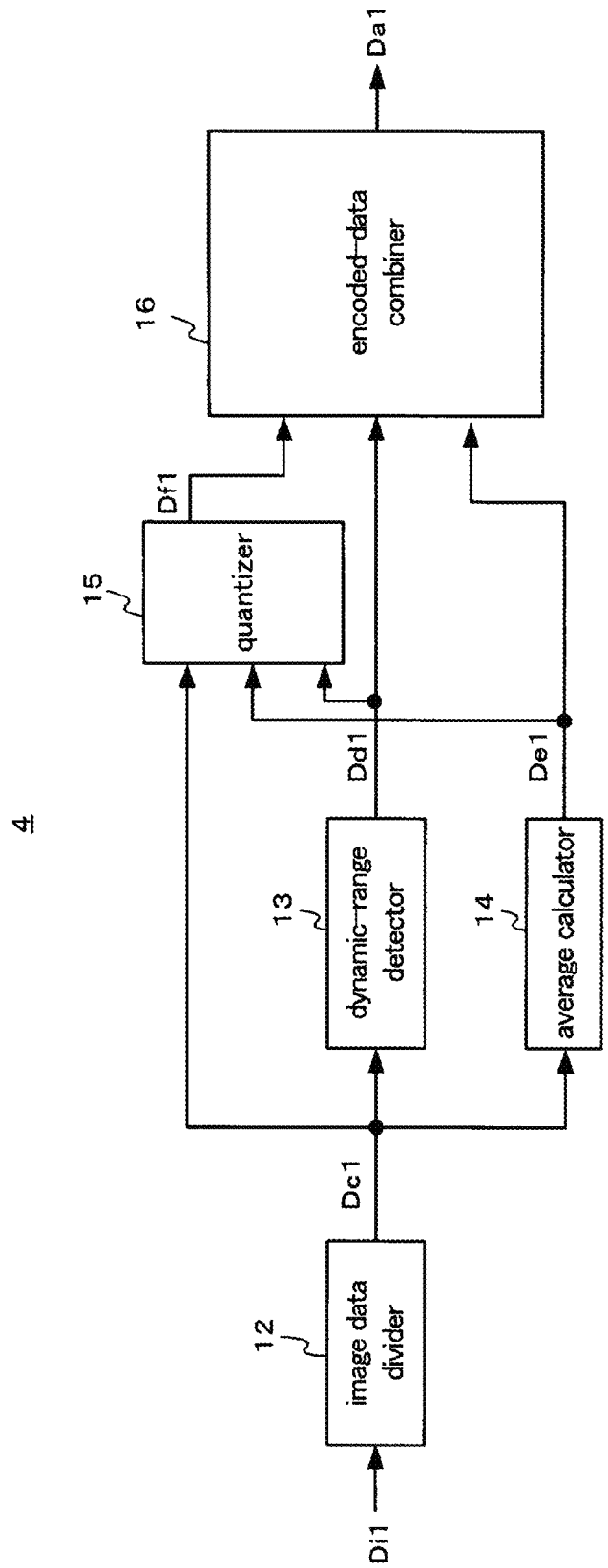

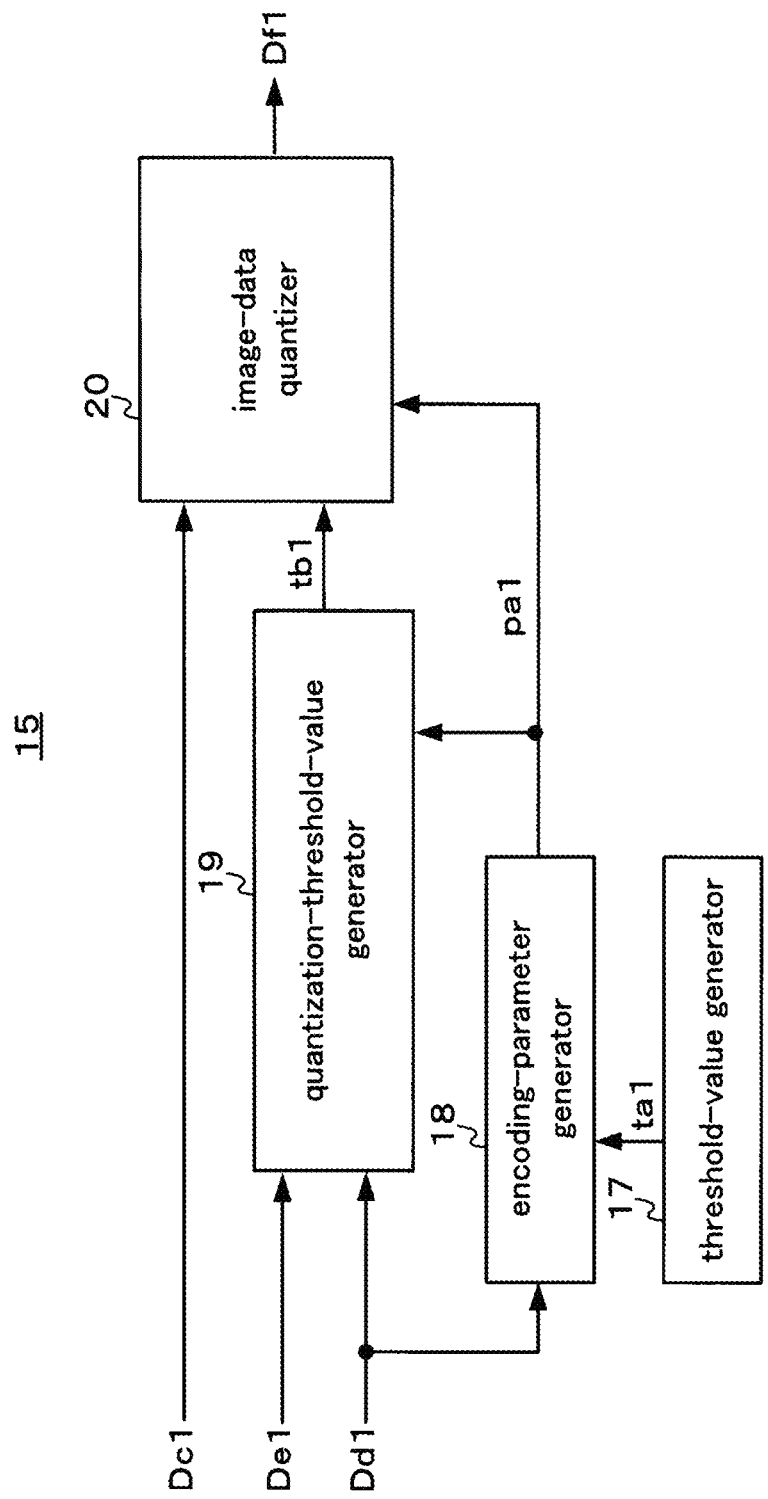

IMAGE PROCESSOR, IMAGE PROCESSING METHOD, IMAGE ENCODER, IMAGE ENCODING METHOD, AND IMAGE DISPLAY DEVICE

FIELD OF THE INVENTION

The present invention relates to image processors and methods of image processing to improve response speed of liquid crystal display devices and the like.

BACKGROUND OF THE INVENTION

Liquid-crystal panels are flat and lightweight. Therefore they have been widely used for displaying devices such as TV receivers, computer displays, and handheld terminals. However, a liquid crystal needs certain amount of time to reach a predetermined transmittance after a driving voltage is applied thereto; therefore, the liquid crystal is insufficient in that it can not respond to moving images with fast changes. In order to solve such a problem, a method has been adopted, in which when a gray-scale value changes between frames, an over-voltage is applied to the liquid crystal so that the liquid crystal reaches a predetermined transmittance within one frame (Japanese Patent No. 2616652). More specifically, current-frame image data is compared, on a pixel basis, with image data preceding by one frame; when a variation in gray-scale value is detected, a correction amount corresponding to the variation is added to the current-frame image data. Thus, when a grey-scale value increases in comparison with that preceding by one frame, a driving voltage being higher than normally used in a liquid crystal panel is applied thereto; when the grey-scale value decreases, a driving voltage being lower than normally used is applied.

In order to perform the above-described method, a frame memory is needed to output the image data preceding one frame. In recent years, as the number of display pixels is increasing due to upsizing of liquid crystal panels, it becomes necessary that the amount of the frame memory is to be increased. When the number of display pixels is increased, the amount of data that is to be stored to/read from the frame memory within a predetermined period (within one frame, for example) is increased; it becomes necessary that the clock frequency to control the storing/reading is increased so as to increase the data transfer rate. Such increase in the amount of the frame memory and the data transfer rate leads to cost increase of liquid crystal displaying devices.

In order to solve these problems, in a liquid-crystal driving circuit described in Japanese Patent Laid-Open No. 2004-163842, image data is encoded and then stored into a frame memory, so that the amount of memory is reduced. Furthermore, the driving circuit compensates image data on the basis of comparison between the current-frame-decoded image data obtained by decoding the encoded image data and the one-frame-preceding-decoded image data obtained by decoding the encoded image data delayed by one frame; therefore, when stationary images are inputted, the driving circuit can prevent the liquid crystal from being applied with unnecessary over-voltages due to the error introduced by encoding/decoding.

A liquid-crystal driving circuit according to Patent Document 2 encodes image data, regardless of its aspects, by quantizing the image data on a block basis with a constant quantization level so as to encode it; therefore, when image data with a large dynamic range is inputted, introducing large errors by encoding/decoding, those errors may affect by large amounts the image data to be compensated. Thus, inputting an image with a large dynamic range causes a problem in that unnecessary over-voltages are applied to the liquid crystal.

This present invention is made in light of the above problems, and aims to provide an image processing device to drive a liquid crystal that can accurately correct image data without effects of the error introduced by encoding/decoding in the liquid-crystal driving circuit that encodes/decodes the image data so as to reduce its amount of frame memory, and can apply the liquid crystal with appropriately corrected voltages.

SUMMARY OF THE INVENTION

An image processor according to the present invention outputs image data including a gray-scale value of each image pixel corresponding to a voltage applied to a liquid crystal, so as to correct the gray-scale value on the basis of a change of the gray-scale value; the image processor comprising:
  an encoding means for quantizing image data of a current frame on a block basis and outputting encoded image data corresponding to the current frame image;
  a first decoding means for decoding the encoded image data outputted from the encoding means thereby outputting first decoded image data corresponding to the current frame image data;
  a delaying means for delaying the encoded image data outputted from the encoding means by a period equivalent to that of one frame;
  a second decoding means for decoding the encoded image data outputted from the delaying means, thereby outputting second decoded image data corresponding to image data preceding the current frame by one frame;
  a variation calculating means for calculating a variation between the first decoded image data and the second decoded image data for each pixel;
  a one-frame-preceding image calculating means for calculating reproduced image data corresponding to the image data preceding the current frame by one frame, using the variation and the current frame image data; and
  a compensating means for correcting the gray-scale value of the current frame image based on the current frame image data and the reproduced image data;
  wherein the encoding means adjusts the number of bits for quantizing the image data in each block of the current frame based on a dynamic range of image data in each block of the current frame.

An image processing method according to the present invention outputs image data representing a gray-scale value of each image pixel corresponding to a voltage applied to a liquid crystal, so as to correct the gray-scale value on the basis of its change, the method comprising the steps of:
  quantizing image data of a current frame on a block basis and outputting encoded image data corresponding to the current frame image;
  decoding the encoded image data outputted from the encoding means thereby outputting first decoded image data corresponding to the current frame image data;
  delaying the encoded image data outputted from the encoding means by a period equivalent to that of one frame;
  decoding the encoded image data outputted from the delaying means thereby outputting second decoded image data corresponding to image data preceding the current frame by one frame;
  calculating a variation between the first encoded image data and the second encoded image data for each pixel;
  calculating reproduced image data corresponding to the image data preceding the current frame by one frame, using the variation and the current frame image data; and correcting the gray-scale value of the current frame image based on the current frame image data and the reproduced image data;

wherein the number of bits for quantizing image data in each block of the current frame is adjusted based on a dynamic range of the image data in each block of the current frame.

An image encoder according to the present invention includes an image-data dividing means for diving image data into image data blocks thereby outputting block image data;

a dynamic range producing means for detecting a dynamic range of the block image data thereby outputting dynamic range data;

an average calculating means for calculating an average of the block image data thereby outputting average data;

a quantizing means for quantizing the block image data, using a quantization threshold value determined by the dynamic range data and the average data, thereby outputting quantization image data; and an encoded data combining means for generating encoded image data corresponding to the block image data, from the quantization image data, the dynamic range data, and the average data;

wherein the quantizing means adjusts the number of bits for quantizing the block image data, depending on the dynamic range of the block image data.

An image encoding method according to the present invention includes the steps of dividing image data into image data blocks thereby outputting block image data;

detecting a dynamic range of the block image data thereby outputting dynamic range data;

calculating an average of the block image data thereby outputting average data;

quantizing the block image data, using a quantization threshold value determined by the dynamic range data and the average data, thereby outputting quantization image data; and generating encoded image data corresponding to the block image data, from the quantization image data, the dynamic range data, and the average data;

wherein the number of bits for quantizing the block image data is adjusted depending on the dynamic range of the block image data.

In the image processors and the image processing methods of the present invention, the number of bits for quantizing image data is adjusted on the basis of a dynamic range of each block. Therefore, the error introduced by encoding is reduced without increasing the data amount of the encoded image data, and the response speed of a liquid crystal can be controlled appropriately by preventing unnecessary voltages from being applied due to the error introduced by encoding.

BRIEF DESCRIPTION OF DRAWINGS

FIG. 1 is a block diagram illustrating a configuration example of an image processor of Embodiment 1;

FIG. 3 is a diagram illustrating an internal configuration of an encoder of Embodiment 1;

FIG. 4 is a diagram illustrating an internal configuration of a quantizer of Embodiment 1;

DETAILED DESCRIPTION OF THE PREFERRED EMBODIMENTS

Figure 2A:
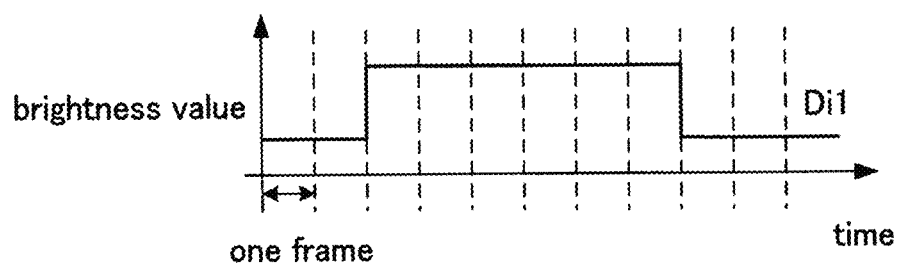
FIG. 2 are diagrams illustrating response characteristics of a liquid crystal.

Embodiment 1.

FIG. 1 is a block diagram illustrating a configuration of a liquid crystal display device provided with an image processor according to the present invention. Image signals inputted through an input terminal 1 are received by a receiver 2. The receiver 2 performs processes such as channel selection and demodulation on received signals and outputs processed signals as current image data $D_{i1}$, which represents one frame image (a current image), successively into an image data processor 3. The image-data processor 3 includes an encoder 4, a delaying unit 5, decoders 6 and 7, a variation calculator 8, a one-frame-preceding image calculator 9, and an image-data compensator 10. The image-data processor 3 corrects the current image data $D_{i1}$ on the basis of its changes in gray-scale values and output corrected image data $D_{j1}$ into a display 11. The display 11 applies to a liquid crystal a predetermined driving voltage specified by the corrected image data $D_{j1}$ to display the image.

Hereinafter, the operations in the image data processor 3 will be explained.

The encoder 4 quantizes the current image data $D_{i1}$ on a block basis so as to compress its data volume and outputs encoded image data $D_{a1}$. Any kind of method using a block truncation coding method (BTC) such as FTB or GBT, quantizing image data on a block basis, can be applicable for the encoder 4. Furthermore, an irreversible encoding method, in which the decoded image data does not perfectly coincide with the image data before encoded, may be also applicable. The encoder 4 determines the number of bits for quantization depending on a dynamic range of each block. This process will be described later.

The delaying unit 5 delays the encoded image data $D_{a1}$ by a period equivalent to that of one frame and outputs one-frame-preceding encoded image data $D_{a0}$. Here, by increasing the encoding rate (the data compression rate) of the image data $D_{i1}$ of the encoder 4, the memory size of the delaying unit 5 to delay the encoded image data $D_{a1}$ can be reduced.

The decoder 6 discriminates the number of bits of the encoded image data $D_{a1}$ on a block basis and decodes the encoded image data $D_{a1}$, and outputs decoded image data $D_{b1}$ corresponding to the current image data $D_{i1}$. The decoder 7 discriminates the number of bits of the encoded image data $D_{a0}$ delayed by a period equivalent to one frame by the delaying unit 5 on a block basis and decodes the encoded image data $D_{a0}$, and outputs decoded image data $D_{b0}$ representing the image preceding by one frame.

The variation calculator 8 calculate on a pixel basis a gray-scale-value variation $D_{v1}$ from the one-frame-preceding image to the current image, by subtracting the decoded image data $D_{b1}$ corresponding to the current-frame image data from the decoded image data $D_{b0}$ corresponding to the image data preceding by one frame. The variation $D_1$ is inputted into the one-frame-preceding image calculator 9, together with the current image data $D_{i1}$.

The one-frame-preceding image calculator 9 adds to the current image data $D_{i1}$ the gray-scale-value variation $D_{v1}$ outputted from the variation calculator 8 and produce one-frame-preceding image data $D_{q0}$. The one-frame-preceding image data $D_{q0}$ is inputted into the image-data compensator 10.

Figure 2B:
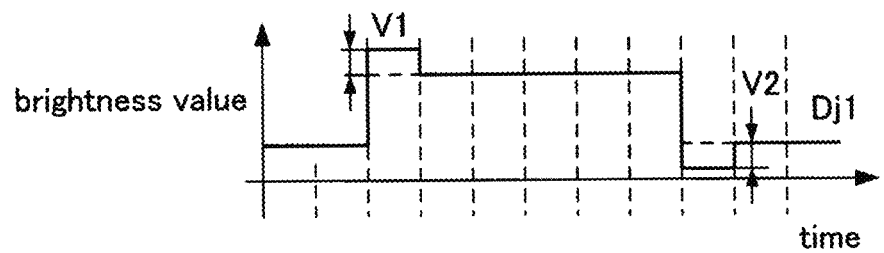
Figure 2C:
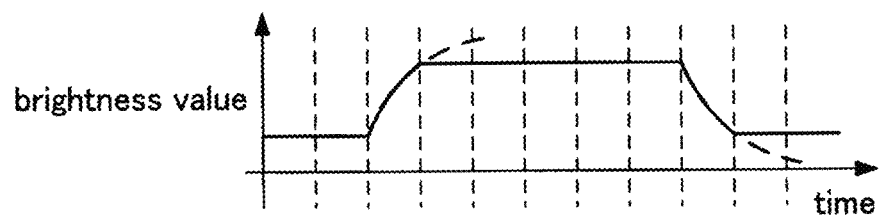

The image-data compensator 10 corrects image data $D_{i1}$ on the basis of the grey-scale-value variation obtained from the comparison between the current image data $D_{i1}$ and the one-frame-preceding image data $D_{q0}$, so that transmittance of the liquid crystal reaches a predetermined value specified by the image data $D_{i1}$ within one frame period, and outputs the corrected image data $D_{j1}$. FIGS. 2 are diagrams that illustrate response characteristics of the liquid crystal when driving voltages based on the corrected image data $D_{j1}$ are applied to the liquid crystal. FIG. 2A is a diagram of the current image data $D_{i1}$. FIG. 2B is a diagram of the corrected image data $D_{j1}$. FIG. 2C is a diagram of the response characteristics of the liquid crystal when driving voltages based on the image data $D_{j1}$ are applied to the liquid crystal. A broken line shown in FIG. 2C represents the response characteristics of the liquid crystal when the driving voltages based on the image data $D_{j1}$ are applied to the liquid crystal. As shown in FIG. 2B, when a gray-scale value increases/decreases, correction amounts $V_1$ and $V_2$ are added to/subtracted from the current image data $D_{i1}$ so as to produce the corrected image data $D_{j1}$. Applying to the liquid crystal the driving voltages based on the corrected image data $D_{j1}$ as shown in FIG. 2C, the liquid crystal can obtain the predetermined transmittance specified by the current image data $D_{i1}$ within approximate one frame period.

Hereinafter, the configurations and operations of the encoder 4 will be explained.

FIG. 3 is a block diagram that illustrates an internal configuration of the encoder 4. The encoder 4 includes an image-data divider 12, a dynamic-range detector 13, an average calculator 14, a quantizer 15, and an encoded-data combiner 16.

The image-data divider 12 divides the current image data $D_{i1}$ into blocks each having the predetermined number of pixels so as to output block image data $D_{c1}$. The dynamic-range detector 13 detects a dynamic range of image data for each block and outputs the dynamic-range data $D_{d1}$. The average calculator 14 calculates an average of image data for each block and outputs the average data $D_{e1}$. The quantizer 15 quantizes each pixel data of the block image data $D_{c1}$ and output the quantization image data $D_{f1}$. The encoded-data combiner 16 combines bit data of the dynamic-range data $D_{d1}$, the average data $D_{e1}$, and the quantization image data $D_{f1}$, and output combined bit data as the encoded image data $D_{a1}$.

FIG. 4 is a diagram that illustrates an internal configuration of the quantizer 15. The quantizer 15 includes a threshold value generator 17, an encoding-parameter generator 18, a quantization-threshold-value generator 19, and an image-data quantizer 20.

The threshold value generator 17 outputs switching threshold values $t_{a1}$ for switching the number of bits for quantizing the block image data $D_{c1}$ depending on its dynamic-range data $D_{d1}$. The encoding-parameter generator 18 determines the number of bits for quantizing the block image data $D_{c1}$ according to a comparison between the dynamic-range data $D_{d1}$ with the switching threshold values $t_{a1}$, and output an encoding parameter Pal that specifies the number of bits for its quantization.

The quantization-threshold-value generator 19 calculates quantization-threshold values $t_{b1}$ used for quantizing the block image data $D_{c1}$, based on the dynamic-range data $D_{d1}$, the average data $D_{e1}$, and the number of bits for quantization specified by the encoding parameter Pal. The quantization-threshold values $t_{b1}$ have threshold values whose number is the number of bits for quantization subtracted by one.

The image-data quantizer 20 quantize the block image data $D_{c1}$ by converting each pixel data of the block image data $D_{c1}$ into the closest one of the quantization-threshold values $t_{b1}$, and outputs the converted data as the quantization image data $D_{f1}$.

Figure 5:
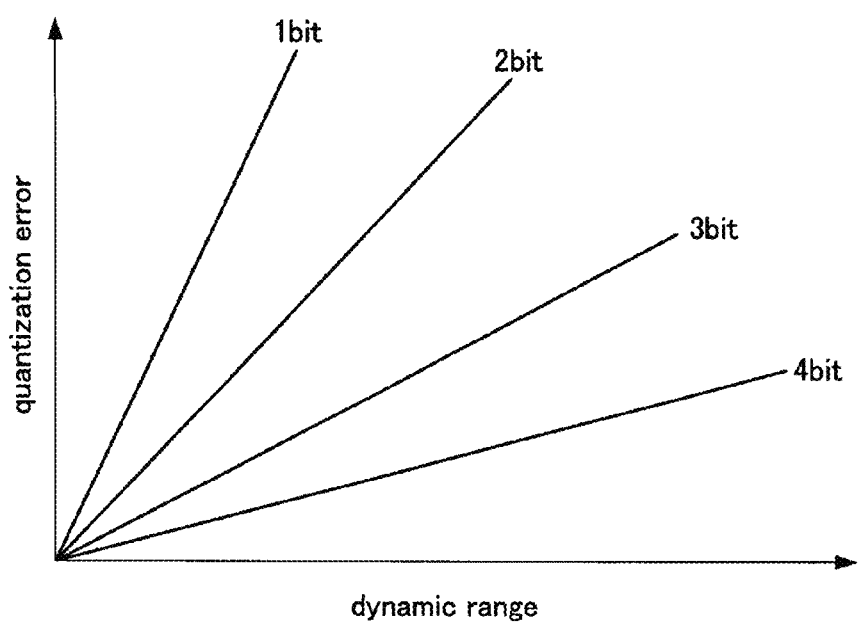
FIG. 5 is a diagram illustrating a relationship between a dynamic range and a quantization error.

FIG. 5 is a diagram that illustrates relationships between the dynamic-range data $D_{d1}$ of the block image data $D_1$ and errors caused by quantization when the number of bits for quantization is set 1, 2, 3, and 4, respectively. As shown in FIG. 5, the larger the dynamic-range data $D_{d1}$ is, the larger the error caused by quantizing the block image data $D_{c1}$ becomes. Therefore, the error caused by the quantization can be curbed without increasing the amount of encoded data by increasing the number of bits for quantization when the dynamic-range data $D_{d1}$ is large, and decreasing the number of bits for quantization is made small, when the dynamic-range data $D_{d1}$ is small.

Figure 6:
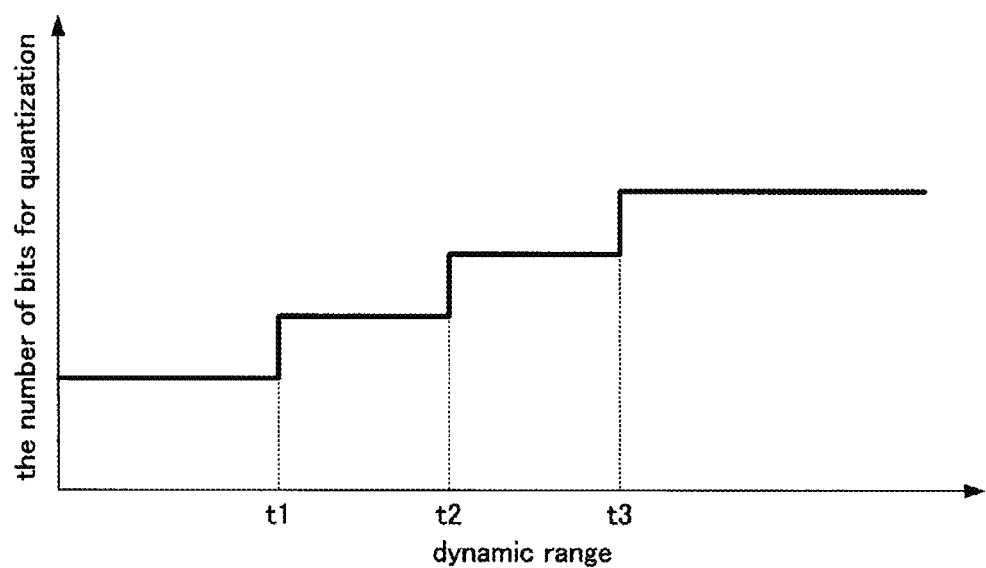
FIG. 6 is a diagram illustrating an example of relationships between the dynamic range and the number of bits for quantizing block image data.

FIG. 6 is a diagram illustrating a relationship between the dynamic range $D_{d1}$ and the number of bits for quantizing the block image data $D_{c1}$. In FIG. 6, symbols '$t_1$' through '$t_3$' each represent the threshold values $t_{a1}$ at which the number of bits for quantization is changed. As shown in FIG. 6, the encoding-parameter generator 18 determines the number of bits for quantizing the block image data $D_{c1}$, depending on its dynamic-range data $D_{d1}$. In FIG. 6, three threshold values have been set as the switchable threshold values, however, the number of threshold values is not limited to it.

Figure 7:
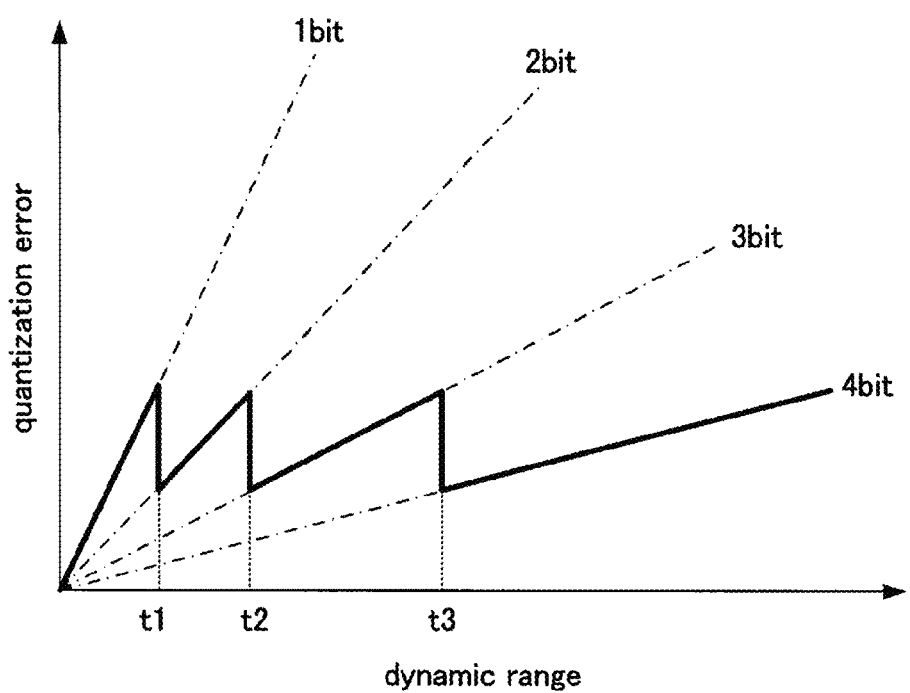
FIG. 7 is a diagram illustrating a relationship between the dynamic range and the quantization error.

FIG. 7 is a diagram that illustrates relationships between the dynamic-range data $D_{d1}$ and the error caused by quantization when the number of bits for quantization is switched depending on the dynamic range $D_{d1}$ as shown in FIG. 6. In an example shown in FIG. 7, the number of bits for quantization is switched 1, 2, 3 and 4, when the dynamic range data is $D_{d1} \leq t_1$, $t_1 < D_{d1} \leq t_2$, $t_2 < D_{d1} \leq t_3$ and $D_{d1} > t_3$, respectively. As shown in FIG. 7, the error caused by the quantization can be reduced by increasing the number of bits for quantization when the dynamic-range data $D_{d1}$ is large, and the amount of encoded data can be reduced by decreasing the number of bits for quantization when the dynamic-range data $D_{d1}$ is small.

Figure 8:
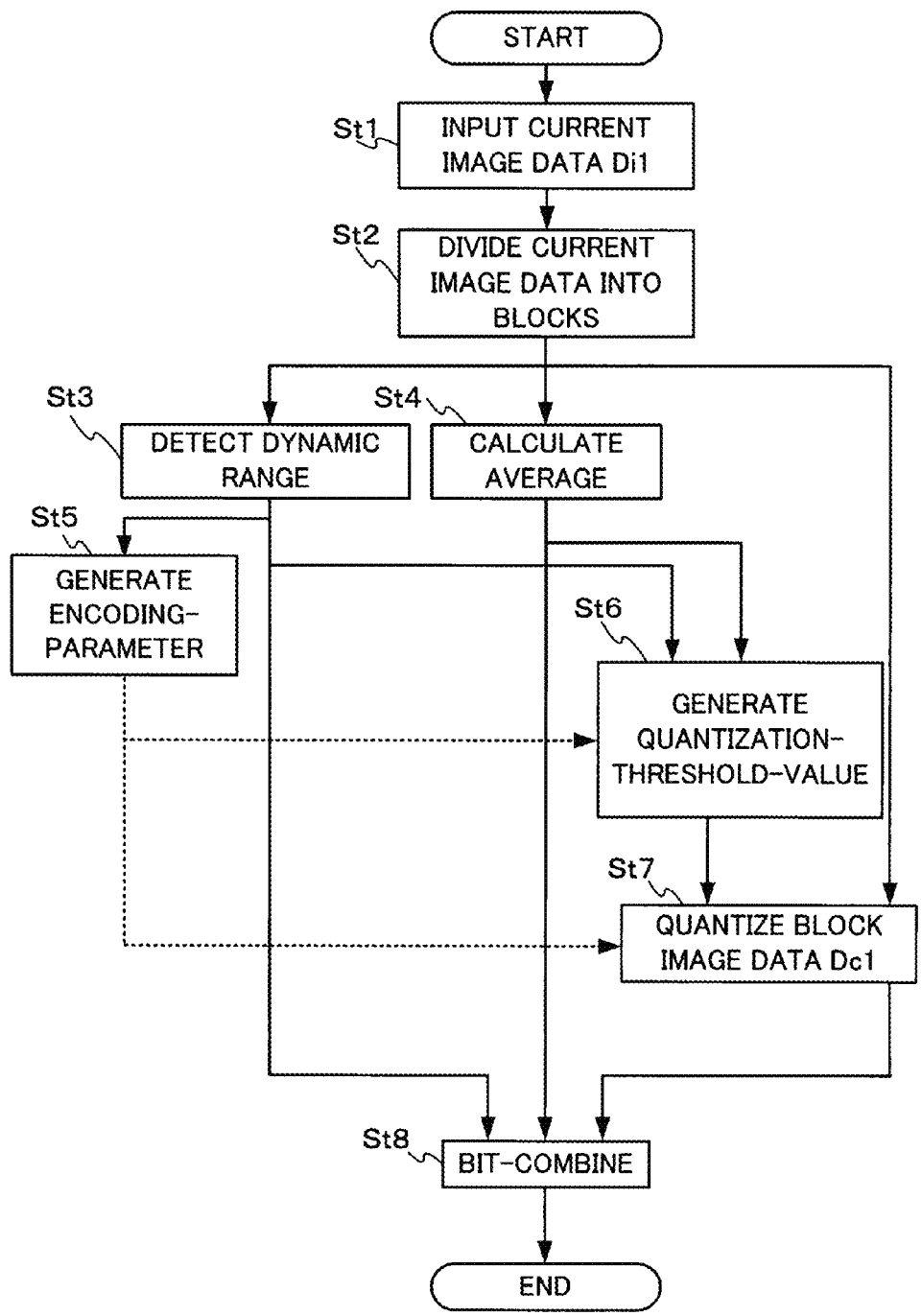
FIG. 8 is a flow chart for explaining operations of the encoder of Embodiment 1.

FIG. 8 is a flow chart illustrating each process performed in the encoder 4 explained above. First, the current image data $D_{i1}$ is inputted into the image-data divider 12 (St1). The image-data divider 12 divides the current image data $D_{i1}$ into blocks and output the block image data $D_1$ (St2). The dynamic-range detector 13 detects a dynamic range data $D_{d1}$ of the block image data $D_{c1}$ (St3). The average calculator 14 calculates the average data Del of the block image data $D_{c1}$ (St4). The encoding-parameter generator 18 determines the number of bits for quantization on the basis of results of comparison between the dynamic-range data $D_{d1}$ and the switching threshold values $t_{a1}$ and output the encoding parameter Pal that specifies the number of bits for quantization (St5). The quantization-threshold-value generator 19 calculates the quantization-threshold values $t_{b1}$ corresponding to the number of bits for quantization specified by the encoding parameter Pal (St6). The image-data quantizer 20 quantizes each pixel data of the block image data $D_{c1}$ on the basis of the quantization-threshold values $t_{b1}$ and output the quantization image data $D_{f1}$ (St7). The encoded data combiner 18 combines bit data of the dynamic-range data $D_{d1}$, the average data $D_{e1}$, and the quantization image data $D_{f1}$, and outputs combined bit data as the encoded image data $D_{a1}$ (St8).

Figure 9:
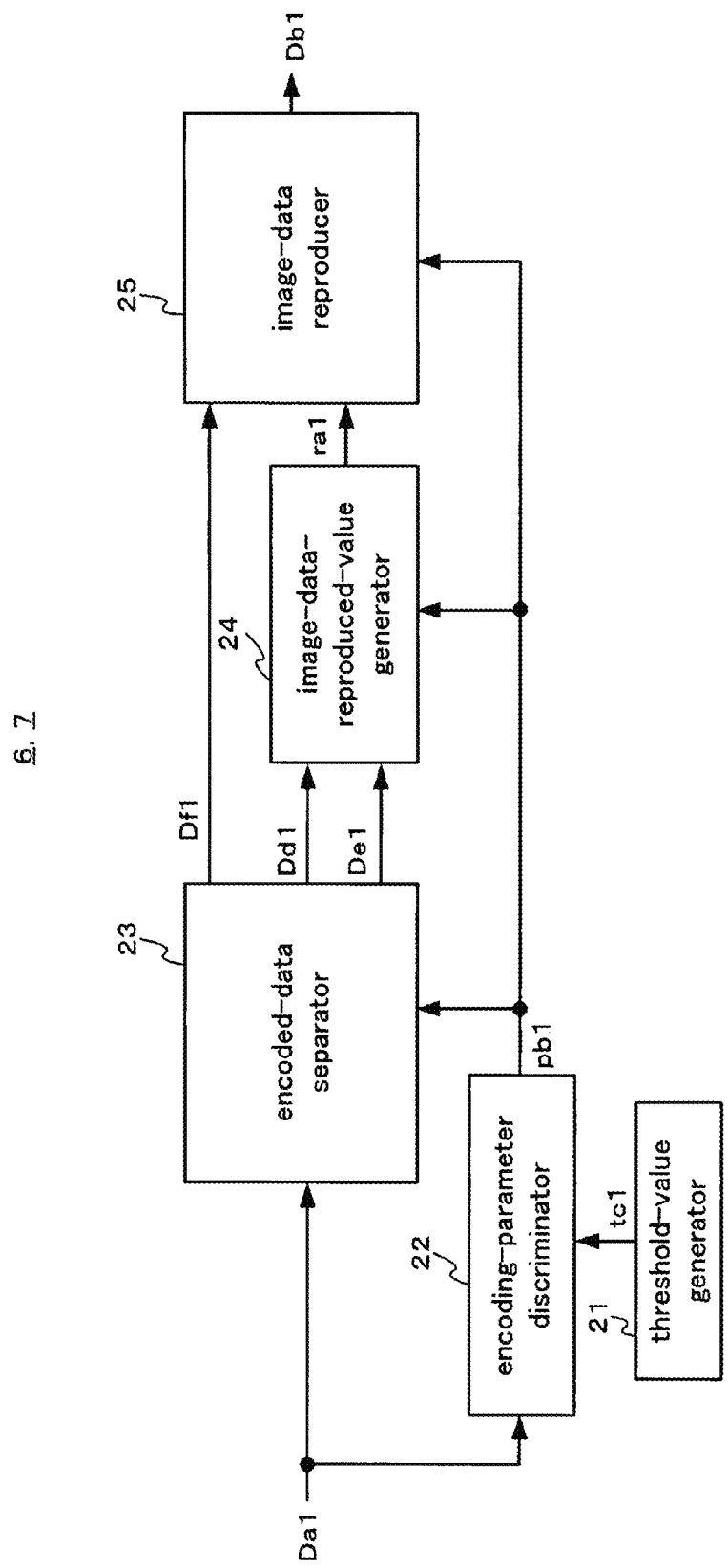
FIG. 9 is a diagram illustrating an internal configuration of a decoder of Embodiment 1.

Next, configurations and operations of the decoders 6 and 7 will be explained. FIG. 9 is a block diagram that illustrates the internal configuration of the decoders 6 and 7. Each of the decoders 6 and 7 includes a threshold-value generator 21, an encoding-parameter discriminator 22, an encoded data separator 23, an image-data-reproduction-value generator 24, and an image-data reproducer 25.

The threshold-value generator 21 outputs discrimination-threshold values $t_{c1}$ set to have same values as the switching threshold values $t_{a1}$ of the encoding parameter. The encoding-parameter discriminator 22 compares the value of the dynamic-range data $D_{d1}$ placed in the upper bits of the encoded data $D_{a1}$ with the discrimination-threshold values $t_{c1}$, and discriminate the encoding parameter Pal. Then, the discriminator 22 outputs the discriminated parameter as an encoding parameter $p_{b1}$. The encoded data separator 23 separates the encoded image data $D_{a1}$ into the dynamic-range data $D_{d1}$, the average data $D_{e1}$, and the quantization image data $D_{f1}$ by referring to the encoding parameter $p_{b1}$ and output them. The pixel-data-reproduction-value generator 24 generates reproduction-value data $r_{a1}$ from the dynamic range data $D_{d1}$ and the average data $D_1$ on the basis of the encoding parameter $p_{b1}$, and outputs reproduced data. The reproduction-value data $r_{a1}$ comprises reproduced values each corresponding to quantized values of the quantization image data, and the number of the reproduced values equals to the number of bits for quantization. The pixel-data reproducer 25 reproduces the decoded image data $D_{b1}$ from the quantization image data $D_{f1}$ on the basis of the reproduction-value data $r_{a1}$ and outputs the decoded image data $D_{b1}$.

Figure 10:
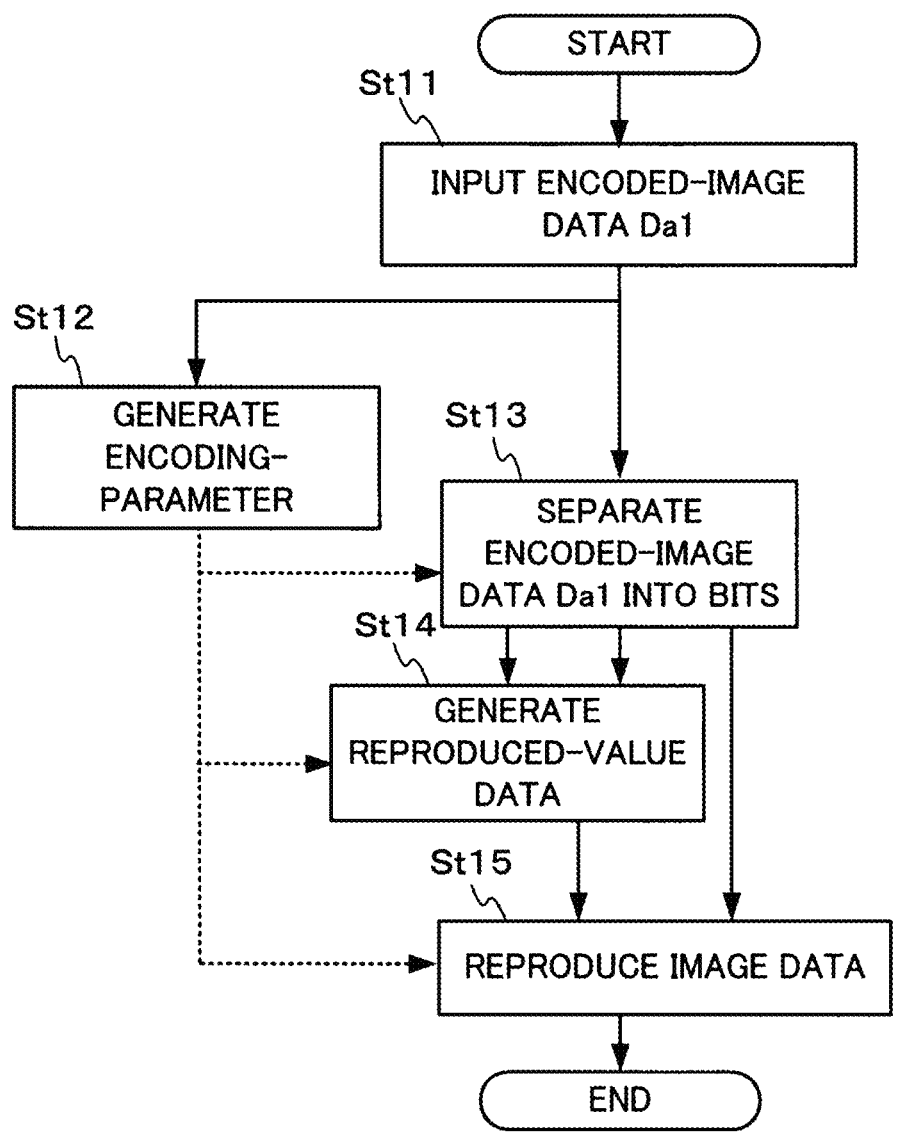
FIG. 10 is a flow chart for explaining operations in the encoder of Embodiment 1.

FIG. 10 is a flow chart that illustrates each decoding process in the decoders 6 and 7. First, the encoded image data $D_{a1}$ is inputted into the encoding-parameter discriminator 22 and the encoded data separator 23 (St11). The encoding-parameter discriminator 22 compares the dynamic-range data $D_{d1}$ placed in the upper bits of the encoded data $D_{a1}$, with the switching threshold values $t_{a1}$ and discriminate the encoding parameter $p_{b1}$ (St12). The encoded data separator 23 separates the encoded image data $D_{a1}$ into the dynamic-range data $D_{d1}$, the average data $D_{e1}$ and the quantization image data $D_{f1}$, by referring to the encoding parameter $p_{b1}$ (St13). The image-data-reproduction-value generator 24 generates the reproduction-value data $r_{a1}$ from the dynamic range data $D_{d1}$ and the average data $D_{e1}$ (St14). The image-data reproducer 25 reproduces the decoded image data $D_{b1}$ from the quantization image data $D_{f1}$ on the basis of the reproduction-value data $r_{a1}$ and outputs the decoded image data (St15).

Figure 11:
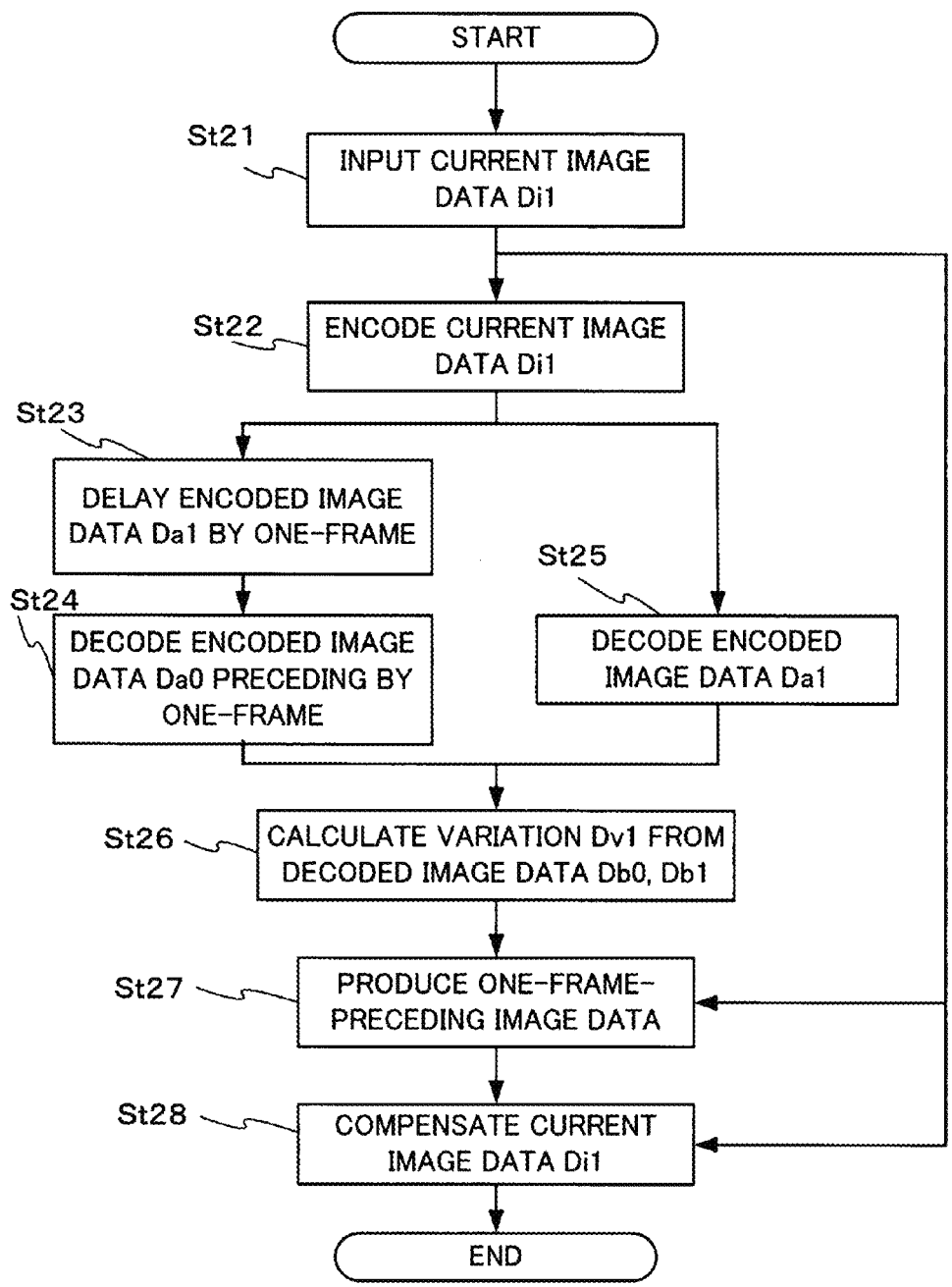
FIG. 11 is a flow chart for explaining operations in the image processor of Embodiment 1.

FIG. 11 is a flow chart illustrating each process in the image processor according to the present invention explained above. First, the current image data $D_{i1}$ is inputted into the image-data processor 3 (St21). The encoder 4 encodes the current image data $D_{i1}$ through the steps shown in FIG. 8, to output the encoded image data $D_{a1}$ (St22). The delaying unit 5 delays the encoded image data $D_{a1}$ by one frame period, to output the one-frame-preceding encoded image data $D_{a0}$ (St23). The decoder 7 decodes the encoded image data $D_{a0}$, to output the decoded image data $D_{b0}$ corresponding to the current image data $D_{i0}$ preceding by one frame (St24). In parallel with these processes, the decoder 6 decodes the encoded image data $D_{a1}$ through the steps shown in FIG. 11, to output the decoded image data $D_{b1}$ corresponding to the current image data $D_{i1}$ (St25).

The variation calculator 8 subtracts the decoded image data $D_{b1}$ from the decoded image data $D_{b0}$ to obtain a grey-scale-value change from the image preceding by one frame to the current image on a pixel basis, and outputs calculated value as the variation $D_{v1}$ (St26). The one-frame-preceding image data calculator 9 adds the variation $D_{v1}$ to the current image data $D_{i1}$, and output calculated value as the one-frame-preceding image data $D_{q0}$ (St27).

Based on the gray-scale-value change obtained by comparing the one-frame-preceding image data $D_{q0}$ with the current image data $D_{i1}$, the image-data compensator 10 calculates a correction amount needed to drive the liquid crystal so that transmittance of the liquid crystal reaches the predetermined value specified by the current image data within one frame period, and the compensator corrects the current image data $D_{i1}$ with the correction amount and output the corrected image data $D_{j1}$ (St28).

The processes of St1 through St28 are performed to each pixel of the current image data $D_{i1}$.

As explained above, in the image processor according to the present invention, to encode the current image data $D_{i1}$, the number of bits for quantization is increased when the dynamic range of the block image data is large, and decreased when the dynamic range of the block image data is small. Thus, the encoded data amount can be prevented from increasing, and the error caused by encoding is reduced. As a result, even when an amount of the image data temporarily stored in the delaying unit 5 is reduced by encoding, the response speed of the liquid crystal can be appropriately controlled without applying unnecessary over-voltages due to the error caused by encoding.

In the above explanations, the image-data compensator 10 calculates the correction amount on the basis of a grey-scale-value variation obtained from comparing the one-frame-preceding image data $D_{q0}$ with the current image data $D_{i1}$, and produces the corrected image data $D_{j1}$, however, the current image data $D_{i1}$ may be corrected by reading out the corresponding correction amount among the correction amounts that have been stored in a memory such as a look-up table.

Figure 12:
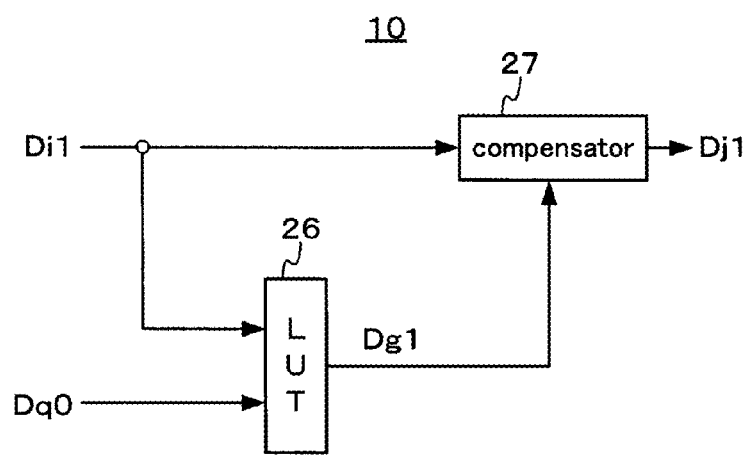
FIG. 12 is a diagram illustrating an internal configuration of an image-data compensator of Embodiment 1.
Figure 13:
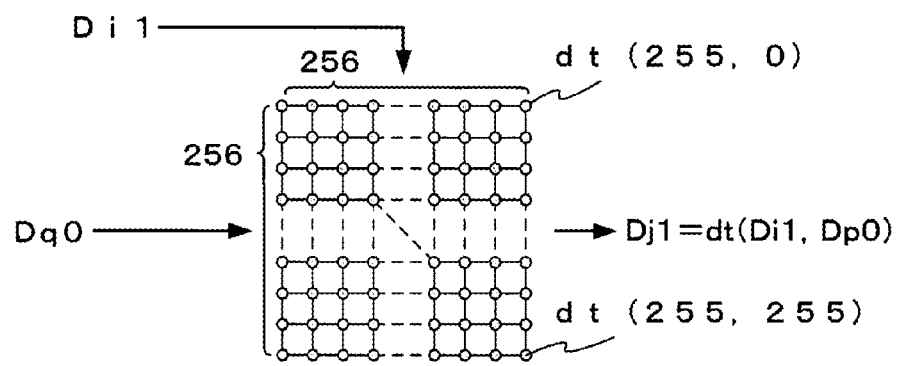
FIG. 13 is a schematic diagram for explaining a configuration of a look-up table.

FIG. 12 is a block diagram that illustrates an example of an internal configuration of the image-data compensator 10. The image-data compensator 10 shown in FIG. 12 includes a look-up table 26 and a compensator 27. When the one-frame-preceding image data $D_{q0}$ and the current image data $D_{i1}$, are inputted to the look-up table 26, the table outputs correction amounts $D_{g1}$ on the basis of both inputted values. FIG. 13 is a schematic diagram that illustrates a configuration example of the look-up table 26. The current image data $D_{i1}$ and the one-frame-preceding image data $D_{q0}$ are inputted as read-out addresses into the look-up table 26. When the current image data $D_{i1}$ and the one-frame-preceding image data $D_{q0}$ are each eight-bit-long image data, the look-up table 26 has the correction amounts $D_{g1}$ whose number is 256×256. The look-up table 26 reads out and outputs a correction amount $D_{g1}$=dt $(D_{i1}, D_{q0})$ corresponding to respective values of current image data $D_{i1}$ and one-frame-preceding image data $D_{q0}$. The compensator 27 adds the correction amount $D_{g1}$ outputted from the look-up table 26 to the current image data $D_{i1}$, to output the corrected image data $D_{j1}$.

Figure 14:
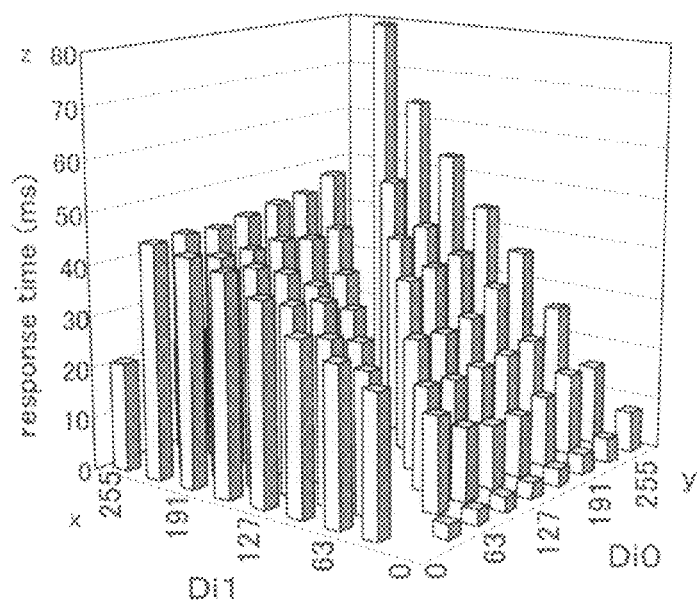
FIG. 14 is a diagram illustrating examples of response speeds of a liquid crystal.

FIG. 14 shows an example of the response speed of a liquid crystal. In FIG. 14, the x-axis represents a value of the current image data $D_{i1}$ (a gray-scale value of the current image), the y-axis represents a value of the current image data $D_{i0}$ preceding by one frame (a gray-scale value of the image preceding by one frame), and the z-axis represents a response time needed for the liquid crystal to obtain a transmittance corresponding to a gray-scale value of the current image data $D_{i1}$ from the transmittance corresponding to that preceding by one frame. When a gray-scale value of a current image data is eight-bit long, there are 256×256 combination in the gray-scale-value of the current image data and the image data preceding by one frame. Accordingly, there are 256×256 patterns in the response times. In FIG. 14, the number of patterns in the response time corresponding to the combination of the gray-scale values is simplified into 8×8.

Figure 15:
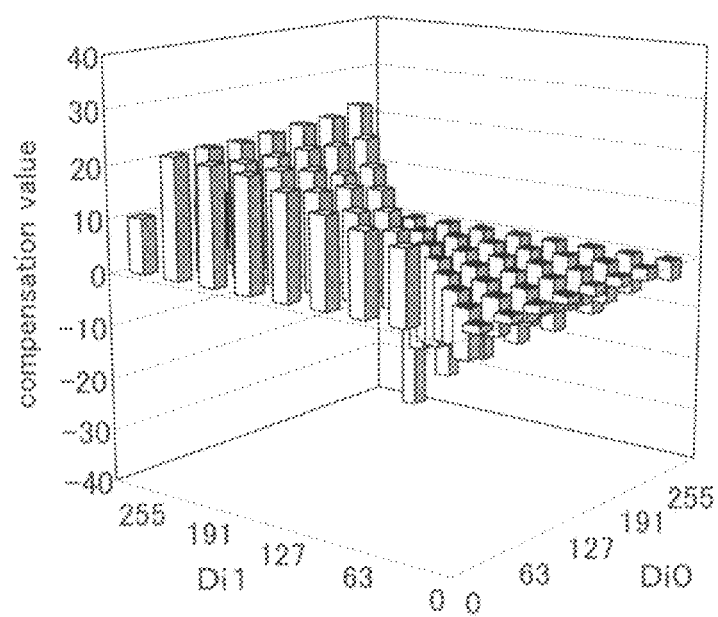
FIG. 15 is a diagram showing examples of correction amounts.

FIG. 15 shows correction amounts $D_{g1}$ to be added to the current image data $D_{i1}$ that enable the liquid crystal to reach the transmittance specified by the current image data $D_{i1}$ when the period of one frame lapses. When a gray-scale value of current image data is eight-bit long, there are 256×256 patterns in the corrected image data $D_{j1}$, corresponding to the combination of the current image data and that preceding by one frame. In FIG. 15, the number of the correction amounts corresponding to the combination of the gray-scale values is simplified into 8×8, similarly to FIG. 14.

As shown in FIG. 14, the response speed of the liquid crystal differs depending on the gray-scale values of the current image data and that preceding by one frame. Thus, the look-up table 26 has 256×256 patterns of correction amounts $D_{g1}$, corresponding to the combination of gray-scale values of a current image data and the image data preceding by one frame. The liquid crystal responds slowly, especially in half-tone levels (gray). Accordingly, the response speed can be efficiently enhanced by increasing the correction amount $D_{g1}$=dt$(D_{i1}, D_{q0})$ that corresponds to the one-frame-preceding image data $D_{q0}$ representing half-tone levels and the current image data $D_{i1}$ representing high-tone levels. In addition, the response characteristics of the liquid crystal vary, depending on its materials, the shape of its electrodes, its temperature and so on. By storing into the look-up table 26 the correction amounts $D_{g1}$ applicable under such use conditions, the response time can be controlled according to the characteristics of the liquid crystal.

The amount of operations for outputting the corrected image data $D_{j1}$ can be reduced, by using the look-up table 26 storing the correction amounts $D_{g1}$.

Figure 16:
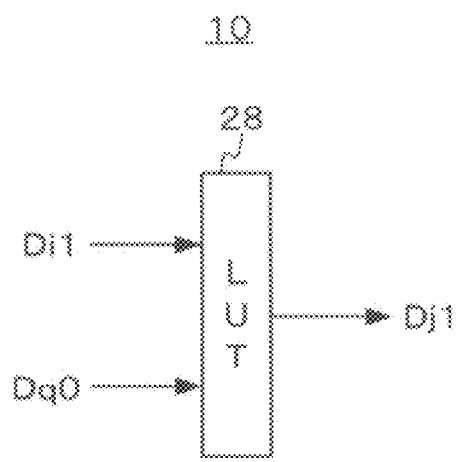
FIG. 16 is a diagram illustrating an example of an internal configuration of the image-data compensator.

FIG. 16 is a block diagram that illustrates another example of an internal configuration of the image-data compensator 10. When the one-frame-preceding image data $D_{q0}$ and the current image data $D_{i1}$ are inputted to a look-up table 28 shown in FIG. 16, the table outputs corrected image data $D_{j1}$=$(D_{i1}, D_{q0})$ on the basis of the two inputted values. 256× 256 patterns of the corrected image data $D_{j1}$=$(D_{i1}, D_{q0})$ obtained by adding the correction amounts $D_{g1}$=$(D_{i1}, D_{q0})$, shown in FIG. 15, to the current image data $D_{i1}$ are stored in the look-up table 28. In addition, the corrected image data $D_{j1}$ is set not to exceed maximum gray-scale value that the display 11 can display.

Figure 17:
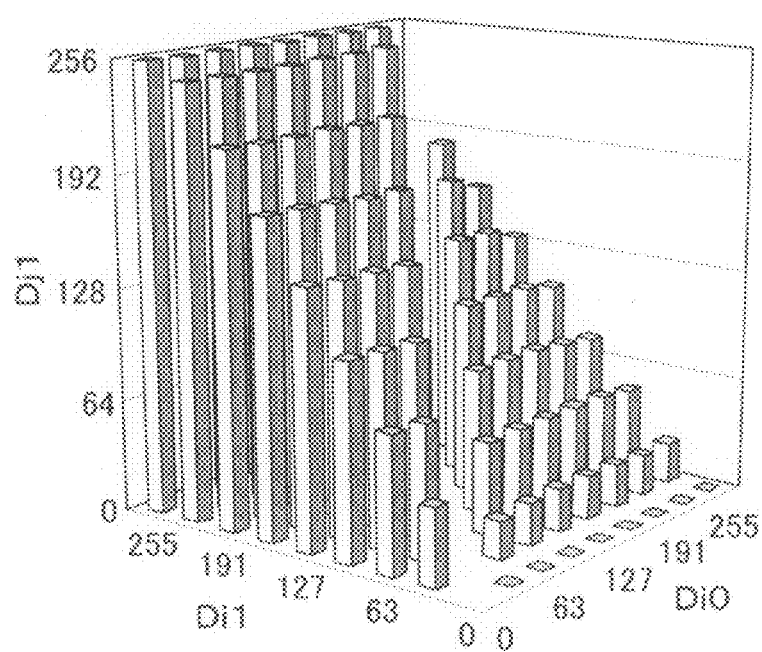
FIG. 17 is a diagram showing examples of corrected image data.

FIG. 17 is a diagram that illustrates an example of the corrected image data $D_{j1}$ stored in the look-up table 28. When a gray-scale value of the current image data is eight-bit long, there are 256×256 patterns of the corrected image data $D_{j1}$, corresponding to the combination of the current image data and the one-frame-preceding image data. In FIG. 17, the number of the corrected amounts corresponding to the combination of the gray-scale values is simplified into 8×8.

In this manner, the corrected image data $D_{j1}$ obtained in advance is stored in the look-up table 28, and based on the current image data $D_{i1}$ and the one-frame-preceding image data $D_{q0}$, the corrected image data $D_{j1}$ corresponding to those data is outputted. Accordingly, the amount of operations for outputting each corrected image data $D_{j1}$ can be reduced.

Embodiment 2.

Figure 18:
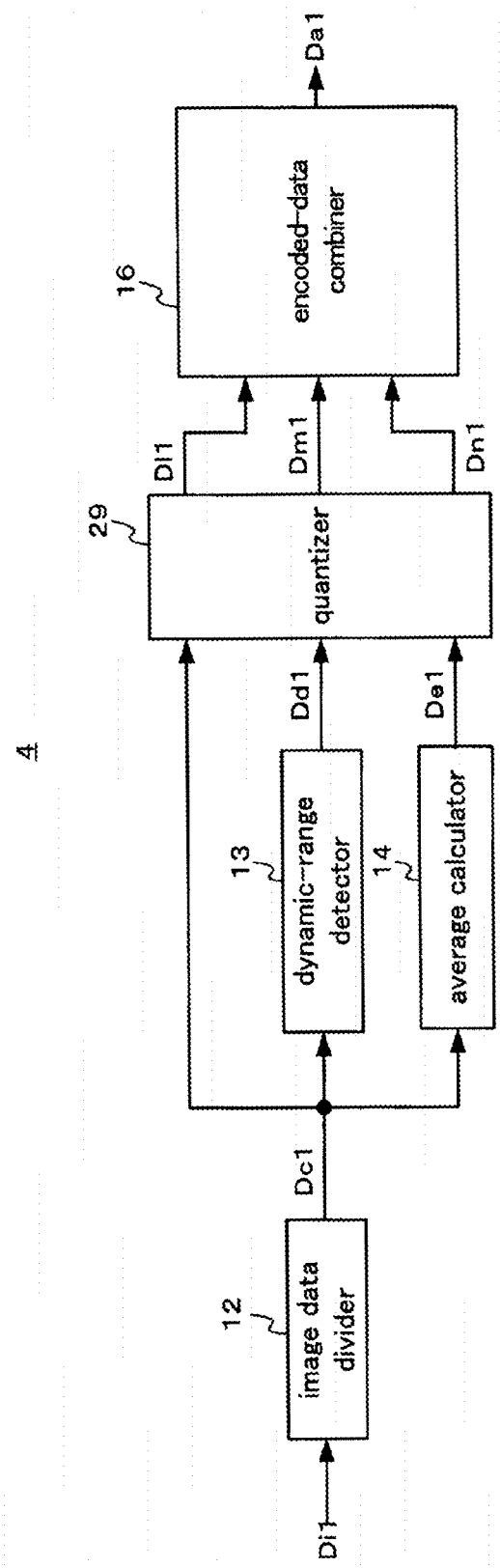
FIG. 18 is a diagram illustrating an internal configuration of an encoder of Embodiment 2.

FIG. 18 is a diagram illustrating the internal configuration of an encoder 4 of the embodiment. In the encoder 4 shown in FIG. 18, a dynamic-range data $D_{d1}$ and an average data $D_{e1}$ are inputted into a quantizer 29 together with block image data $D_{c1}$. The quantizer 29 quantizes the block image data $D_{c1}$, the dynamic-range data $D_{d1}$, and the average data $D_{e1}$ and output quantization image data $D_{f1}$, quantization-dynamic-range data $D_{m1}$, and quantization average data $D_{n1}$.

Figure 19:
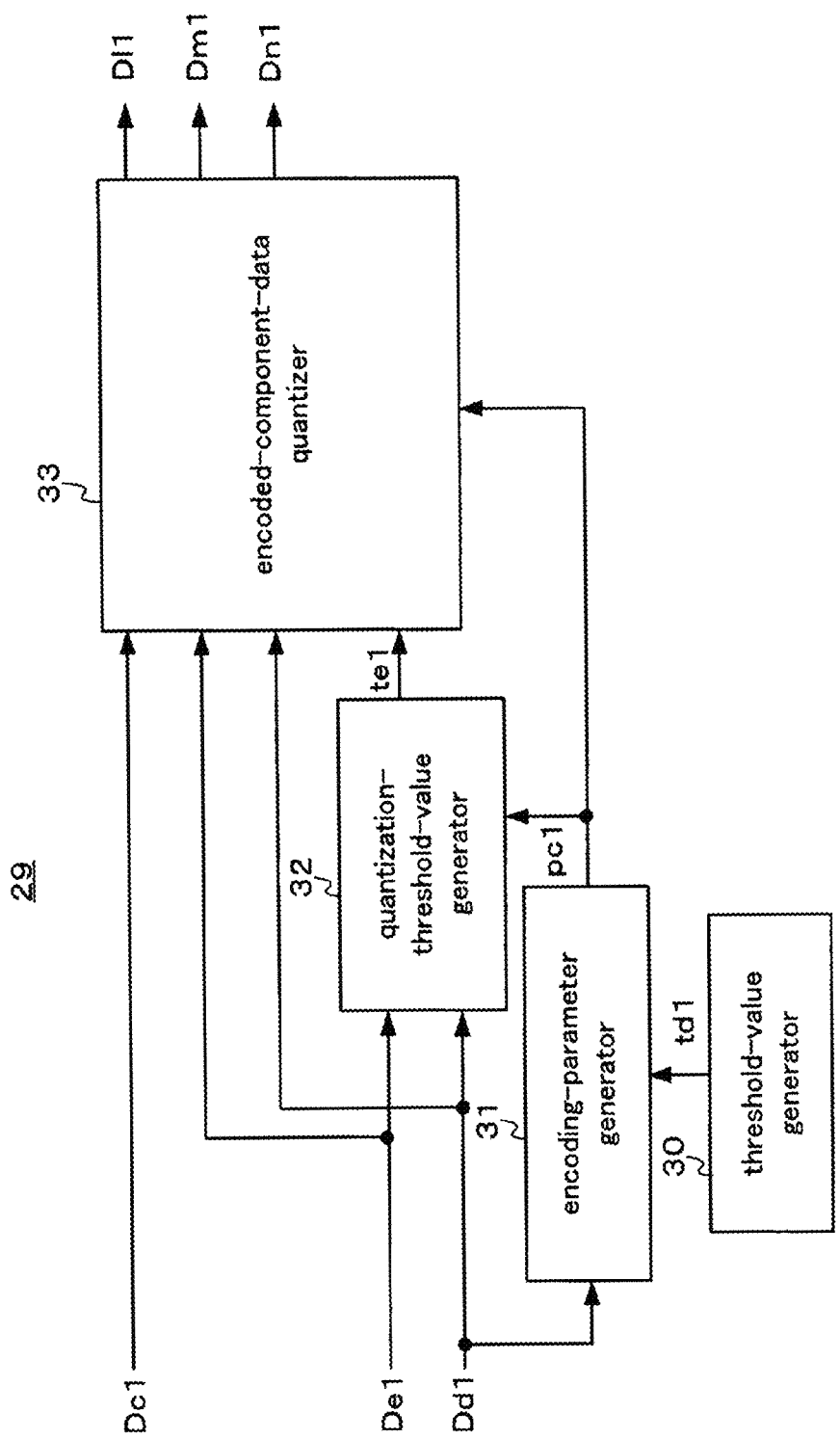
FIG. 19 is a diagram illustrating an internal configuration of a quantizer of Embodiment 2.

FIG. 19 is a diagram that illustrates an internal configuration of the quantizer 29. The quantizer 29 includes a threshold value generator 30, an encoding-parameter generator 31, a quantization-threshold-value generator 32, and an encoded-component-data quantizer 33. The threshold value generator 30 outputs switching threshold values $t_{d1}$ for switching the number of bits for quantizing the block image data $D_{c1}$, the dynamic-range data $D_{d1}$, and the average data $D_{e1}$, depending on a magnitude of the dynamic-range data $D_{d1}$. The encoding-parameter generator 31 determines the numbers of bits for quantizing the block image data $D_{c1}$, the dynamic-range data $D_{d1}$, and the average data $D_{e1}$, based on results of comparing the dynamic-range data $D_{d1}$ with the switchable threshold values $t_{d1}$, and outputs an encoding parameter $p_{c1}$ that specifies the numbers of bits for quantizing these data. The encoding parameter $p_{c1}$ sets the numbers of bits for quantizing the dynamic-range data $D_{d1}$ and the average data $D_{e1}$ so as to maintain the amount of encoded image data $D_{a1}$ constant, even when the number of bits for quantizing the block image data $D_{c1}$ is switched.

Based on the dynamic-range data $D_{d1}$, the average data $D_{e1}$, and the numbers of bits for quantization by the encoding parameter $P_{a1}$, the quantization-threshold-value generator 32 calculates quantization-threshold values $t_{e1}$ used for quantizing the block image data $D_{c1}$, and outputs calculated values into the encoded-component-data quantizer 33.

Figure 20:
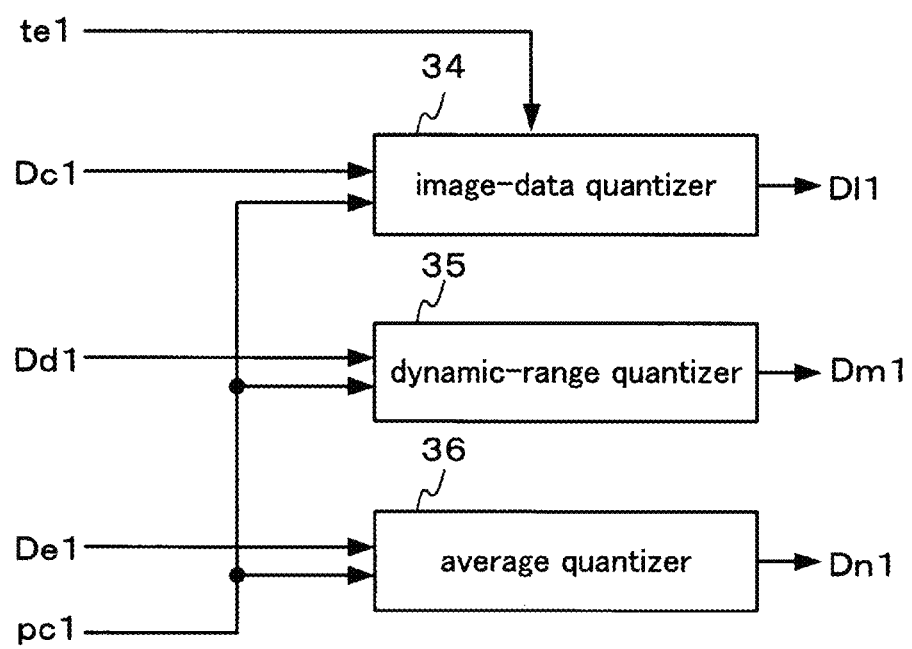
FIG. 20 is a diagram illustrating an internal configuration of an encoded-component-data quantizer of Embodiment 2.

FIG. 20 is a block diagram that illustrates an internal configuration of the encoded-component-data quantizer 33. The encoded-component-data quantizer 33 includes an image-data quantizer 34, a dynamic-range quantizer 35, and an average-value quantizer 36.

The image-data quantizer 34 quantizes each pixel data of the block image data $D_{c1}$ on the basis of the quantization-threshold values $t_{e1}$ and output the quantization image data D11. The dynamic-range quantizer 35 quantizes the dynamic-range data $D_{d1}$, on the basis of the number of bits for quantization specified by the encoding parameter $p_{c1}$ and output the quantization-dynamic-range data $D_{m1}$. The average-value quantizer 36 quantizes the average data $D_{e1}$ on the basis of the number of bits for quantization specified by the encoding parameter $p_{c1}$ and output the quantization average data $D_{n1}$.

Figure 21:
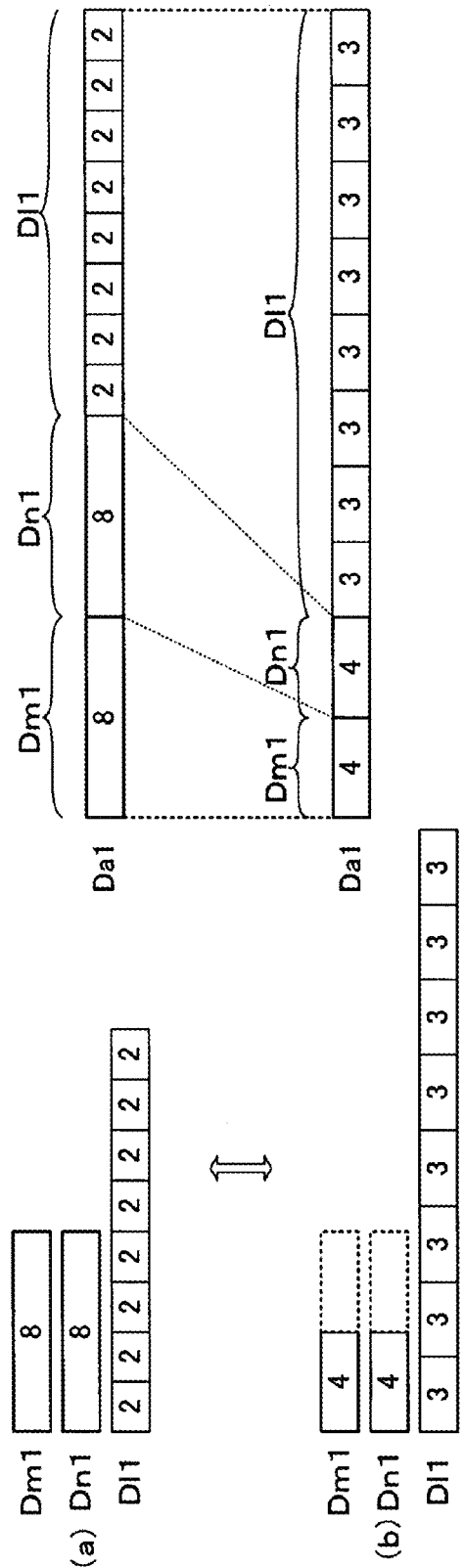
FIG. 21 are diagrams illustrating data structures of encoded image data.

FIG. 21 are diagrams illustrating examples of the quantization image data $D_{l1}$, the quantization-dynamic-range data $D_{m1}$, the quantization average data $D_{n1}$, and the encoded image data $D_{a1}$ obtained by combining them, in the case where 8 pixels are included in the block image data $D_{c1}$. In FIG. 21A, each pixel data of the quantization image data $D_{l1}$ is 2 bit, and both the quantization-dynamic-range data $D_{m1}$ and the quantization average data $D_1$ are eight bit. In FIG. 21B, each pixel data of the quantization image data $D_{l1}$ is 3 bit, both the dynamic-range data $D_{m1}$ and the quantization average data $D_{n1}$ are 4 bits. FIG. 21 illustrate that even when the number of bits of the quantization image data $D_{l1}$ is varied, the numbers of bits for quantizing the quantization-dynamic-range data $D_{m1}$ and the quantization average data $D_1$ are set so as to maintain the amount of the encoded image data $D_{a1}$ constant.

Figure 22:
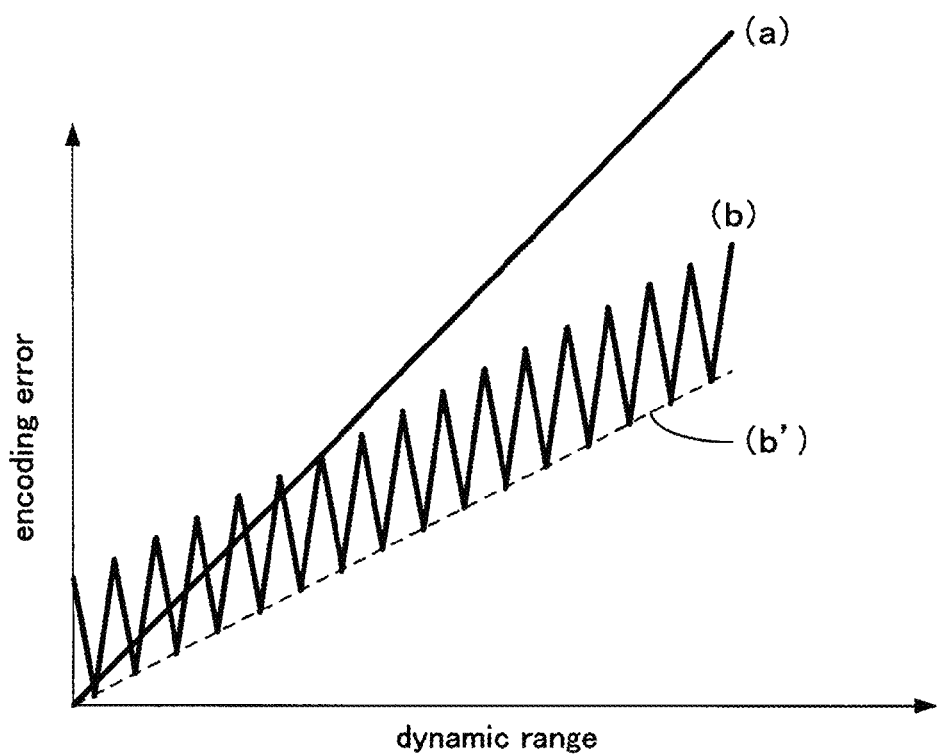
FIG. 22 is a diagram illustrating a relationship between a dynamic range and an error introduced by encoding.

FIG. 22 is a diagram illustrating relationships between the dynamic range data $D_{d1}$ and the error caused by encoding, a line indicated by '(a)' represents an error that occurs in the encoded image data $D_{a1}$ shown in FIG. 21A, a line indicated by '(b)' represents an error that occurs to the encoded image data $D_{a1}$ shown in FIG. 21B. Furthermore, a broken line indicated by '(b')' in FIG. 22 represents an error, when the number of bits for quantization is eight and the quantization-dynamic-rage data $D_{m1}$ and the quantization average data $D_{n1}$ are 8 bits, and the error represented by the zigzag line (b) is the sum of the error represented by the broken line (b') and an error that occurs when the numbers of bits for quantizing the dynamic-range data $D_{d1}$ and the average data $D_{e1}$ are reduced from eight to four.

As shown in FIG. 22, when the dynamic-range data $D_{d1}$ is small, an effect of the error in the quantization-dynamic-range data $D_{m1}$ and the quantization average data $D_{n1}$ is larger than an effect of the error in the quantization image data $D_{l1}$. Therefore, the error represented by the zigzag line (b) corresponding to FIG. 21B, in which the numbers of bits for the quantization-dynamic-range data $D_{m1}$ and the quantization average data $D_{n1}$ are small, becomes larger than the error represented by the line (a). On the other hand, when the dynamic-range data $D_{d1}$ becomes large, an effect of the error in the quantization image data $D_{l1}$ is larger than an effect of the error in the quantization-dynamic-range data $D_{m1}$ and the quantization average data $D_{n1}$. Therefore, the error represented by the line (a) corresponding to FIG. 21A, in which the number of bits for the quantization-dynamic-range data $D_{l1}$ is small, becomes larger than that represented by the line (b).

Figure 23:
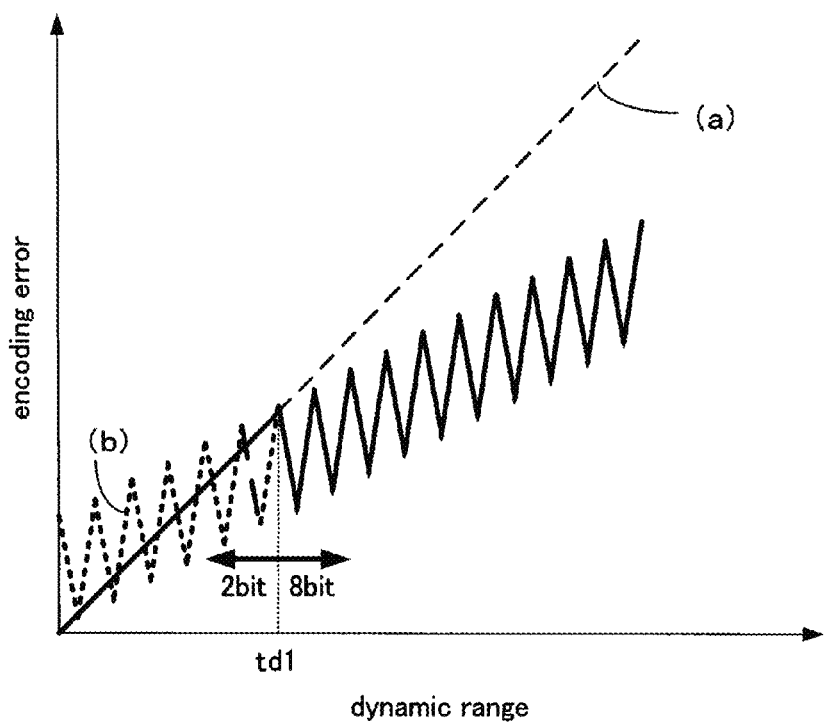
FIG. 23 is a diagram illustrating a relationship between the dynamic range and the error introduced by encoding.

FIG. 23 is another diagram illustrating relationships between the dynamic range data $D_{d1}$ and the error caused by encoding, in the case where the encoded image data $D_{a1}$ shown in FIG. 21A is used when the dynamic-range data $D_{d1}$ of the block image data $D_{c1}$ is smaller than a switching threshold value $t_{d1}$, and the encoded image data $D_{a1}$ shown in FIG. 21B is used when the dynamic-range data $D_{d1}$ is larger than the switching threshold value $t_{d1}$.

As shown in FIG. 23, the error caused by encoding can be reduced without increasing the amount of the encoded data, by increasing the numbers of bits of the quantization-dynamic-rage data $D_{m1}$ and the quantization average data $D_{n1}$, and decreasing the number of bits of the quantization image data $D_{l1}$, when the dynamic-range data $D_{d1}$ is small, and decreasing the numbers of bits for the quantization-dynamic-rage data $D_{m1}$ and the quantization average data $D_{n1}$ and increasing the number of bits of the quantization image data $D_{l1}$, when the dynamic-range data $D_{d1}$ is large.

Figure 24:
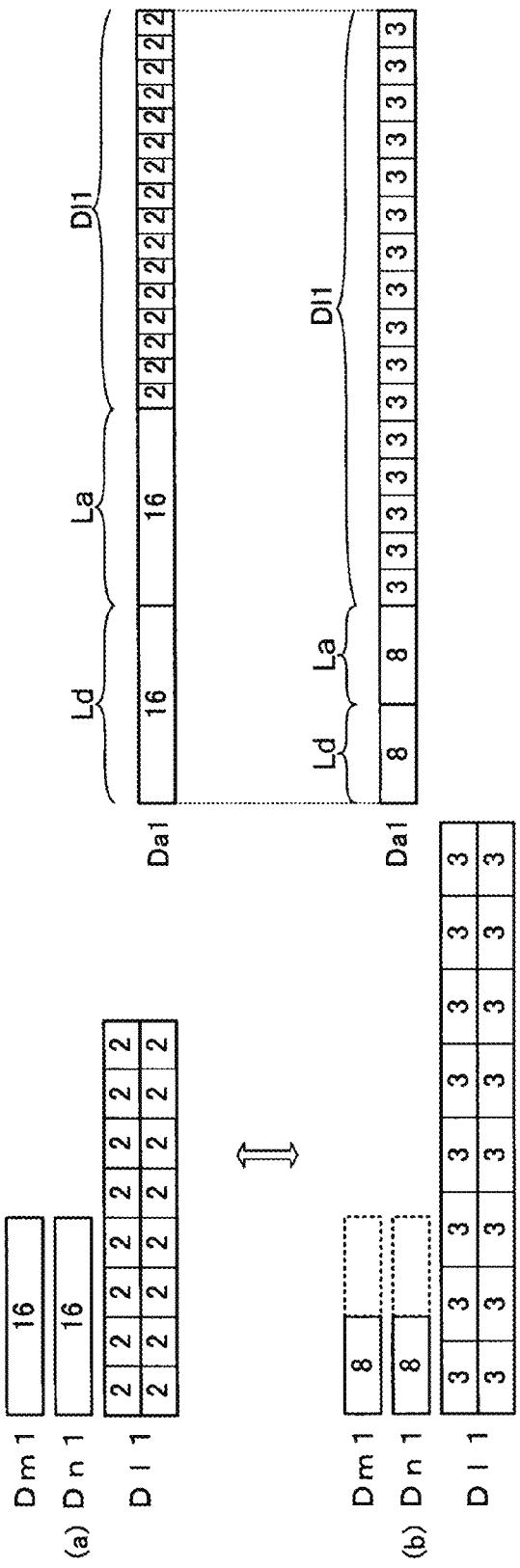
FIG. 24 are diagrams illustrating data structures of encoded image data.

FIG. 24 are diagrams illustrating other examples of the quantization image data $D_{l1}$, the quantization-dynamic-range data $D_{m1}$, the quantization average data $D_{n1}$, and the encoded image data $D_{a1}$ obtained by combining them, in the case where 16 pixels are included in the block image data $D_{c1}$. In FIG. 24A, each pixel data of the quantization image data $D_{l1}$ is 2 bits, and both the quantization-dynamic-range data $D_{m1}$ and the quantization average data $D_1$ are sixteen bit. In FIG. 24B, each pixel data of the quantization image data $D_{l1}$ is 3 bits, both the quantization-dynamic-range data $D_{m1}$ and the quantization average data $D_{n1}$ are eight bit.

As shown in FIG. 24, the numbers of bits for quantizing the quantization image data $D_{l1}$, and the quantization-dynamic-range data $D_{m1}$ and the quantization average data $D_{l1}$, is set according to the number of pixels of the block image data $D_{c1}$.

Figure 25:
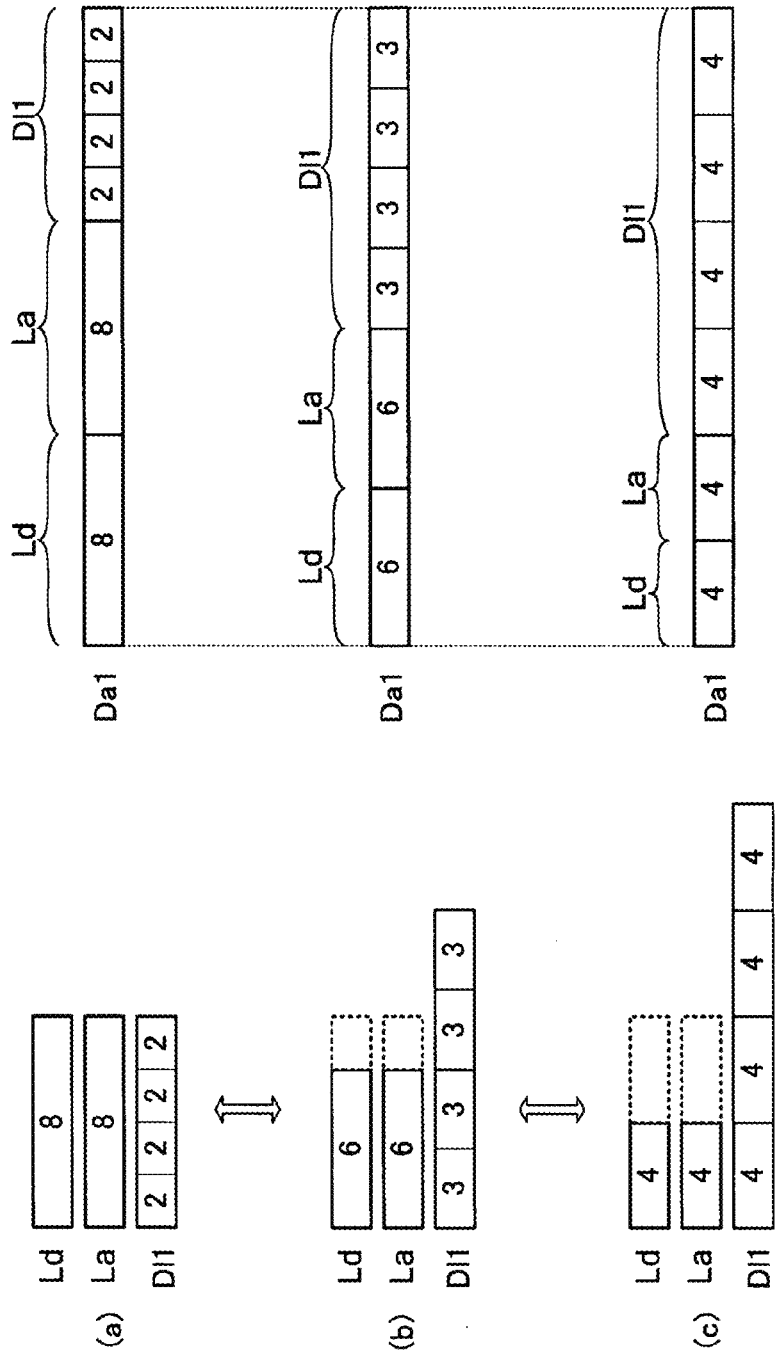
FIG. 25 are diagrams illustrating data structures of encoded image data.

FIG. 25 are diagrams illustrating other examples of the quantization image data $D_{l1}$, the quantization-dynamic-range data $D_{m1}$, the quantization average data $D_{n1}$, and the encoded image data $D_{a1}$ obtained by combining them, in the case where 4 pixels are included in the block image data $D_{c1}$. In FIG. 25A, each pixel data of the quantization image data $D_{l1}$, is 2 bits, and both the dynamic-range data $D_{m1}$ and the quantization average data $D_{n1}$ are eight bit. In FIG. 25B, each pixel data of the quantization image data $D_{l1}$ is 3 bits, and both the quantization-dynamic-range data $D_{m1}$ and the quantization average data $D_1$ are eight bit. In FIG. 25C, each pixel data of the quantization image data $D_{l1}$ is 4 bits, and both the quantization-dynamic-range data $D_{m1}$ and the quantization average data $D_{n1}$ are 4 bits.

The encoding-parameter generator 31 may generate the encoding parameters pal for the numbers of bits for quantization, by using the numbers of bits for quantization presented in FIG. 24A when the dynamic-range data $D_{d1}$ is smaller than a switchable threshold value $t_{d1}$, and using the numbers of bits for quantization presented in FIG. 24B or FIG. 24C when the dynamic-range data $D_{d1}$ is larger. As explained above, three or more encoding parameters $p_{b1}$ can be used by selecting one of them.

Figure 26:
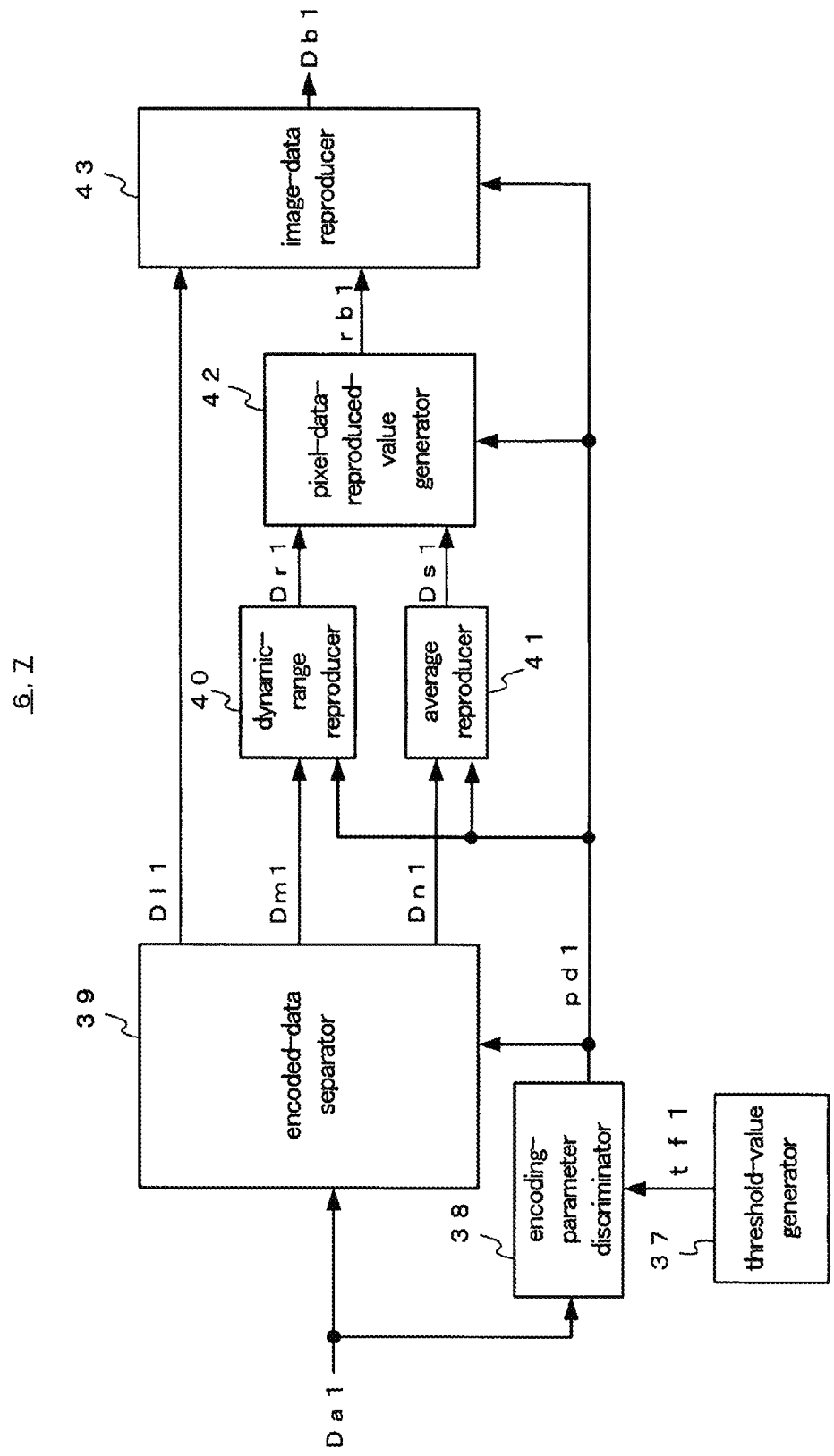
FIG. 26 is a diagram illustrating an internal configuration of a decoder of Embodiment 2.

FIG. 26 is a block diagram illustrating an internal configuration of decoders 6 and 7 of the embodiment. Each of the decoders 6 and 7 includes a threshold-value generator 37, an encoding-parameter discriminator 38, an encoded-data separator 39, a dynamic-range reproducer 40, an average reproducer 41, an image-data-reproduction-value generator 42, and an image data reproducer 43.

The threshold-value generator 37 outputs discrimination-threshold values $t_{f1}$ having same values as the switching threshold values $t_{d1}$ for the encoding parameter. The encoding-parameter discriminator 38 compares the value of the dynamic-range data $D_{d1}$ placed in the upper bits of the encoded data $D_{a1}$ with the discrimination-threshold values $t_{f1}$ and discriminate the encoding parameter $p_{c1}$ for the encoded image data $D_{a1}$. Then, the discriminator outputs the discriminated parameter as an encoding parameter $p_{d1}$. The encoded data separator 23 separates the encoded image data $D_{a1}$ into the quantization image data $D_{i1}$, the quantization-dynamic-range data $D_{m1}$, and the quantization average data $D_1$ so as to output them, by referring to the encoding parameter $p_{d1}$.

The dynamic-range reproducer 40 outputs reproduction-dynamic-range data $Dr_1$, which is reproduced from the quantization-dynamic-range data $D_{m1}$. The average reproducer 41 outputs the quantization-average data $D_{n1}$, which is reproduced from reproduction-average data $D_{x1}$.

The pixel-data-reproduction-value generator 42 generates reproduction-value data $r_{b1}$ from the reproduction-dynamic-range data $Dr_1$ and the reproduction-average data $D_{s1}$ on the basis of the encoding parameter $p_{d1}$. The reproduction-value data $r_{b1}$ comprises reproduced values each corresponding to a quantized value of the quantization image data, and the number of the reproduced values in the reproduction-value data is equal to the number of bits for quantization. The pixel-data reproducer 43 reproduces the decoded image data $D_{b1}$ from the quantization image data $D_{i1}$ on the basis of the reproduction-value data $r_{b1}$.

In the embodiment, the quantization-dynamic-rage data $D_{m1}$ quantized from the dynamic-range data $D_{d1}$ is added to the header of the encoded image data $D_{a1}$, and the switching threshold values $t_{d1}$ for the encoding-parameter are set so as to be able to be compared with the quantization-dynamic-range data $D_{m1}$.

Figure 27:
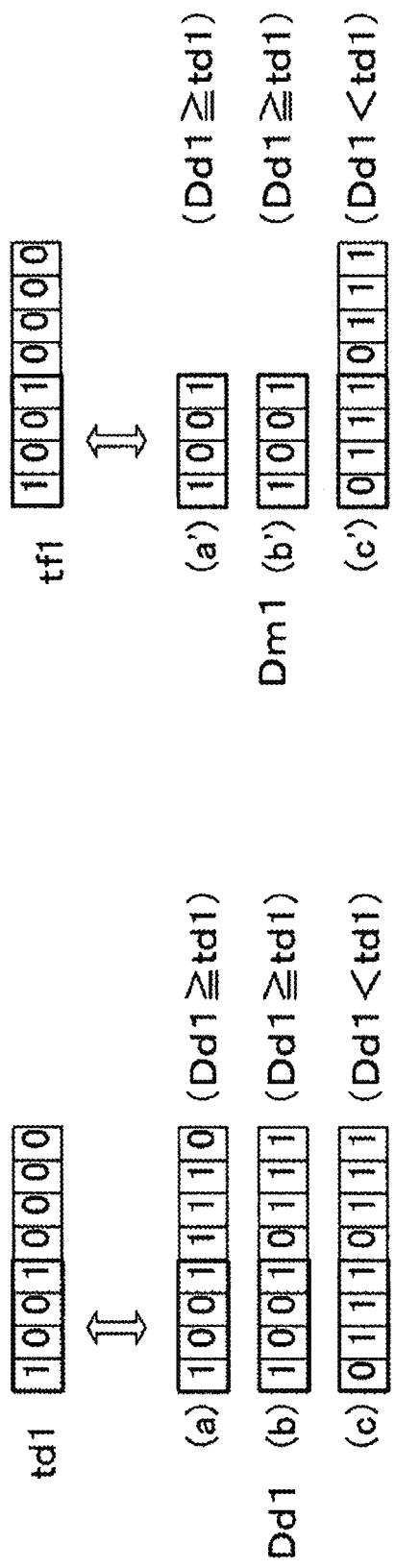
FIG. 27 are diagrams for explaining a switchable threshold value of an encoding parameter.

FIG. 27 are diagrams for explaining values to be set for the switching threshold values $t_{d1}$ for the encoding parameter, in the case where the dynamic-range data $D_{d1}$ is switched to 8 or 4 bits. The switching threshold value $t_{d1}$ shown in FIG. 27 is compared with each value of the dynamic range data $D_{d1}$ indicated by '(a)' through '(c)'. Each value of the quantization-dynamic-range data $D_{m1}$ indicated by '(a')' through '(c')' can be obtained by quantizing the dynamic range data $D_{d1}$ indicated by '(a)' through '(c)'. The quantization-dynamic-range data $D_{m1}$ indicated by '(a')' through '(c')' are compared with a discrimination-threshold value $t_{f1}$.

In the case shown in FIG. 27, since the dynamic range data $D_{d1}$ indicated by '(a)' and '(b)' are greater than the switching threshold value $t_{d1}$ ($D_{d1} > t_{d1}$), the lower 4 bits of the range data are dropped, and since the dynamic range data $D_{d1}$ indicated by '(c)' is smaller than the switching threshold value $t_{d1}$ ($D_{d1} < t_{d1}$), the lower bits of the range data is not dropped. As shown in FIG. 27, since the lower 4 bits of the switching threshold values $t_{d1}$ are set to be zero, a result of comparison between the switching threshold value $t_{d1}$ and the dynamic range data $D_{d1}$ is same as a result of comparison between the discrimination-threshold value $t_{f1}$ and the quantization-dynamic-range data $D_{m1}$ of which lower bits are dropped.

On the other hand, when the lower 4 bits are not dropped, the quantization-dynamic-range data $D_{m1}$ can not be compared with the discrimination-threshold value $t_{f1}$, as explained below.

Figure 28:
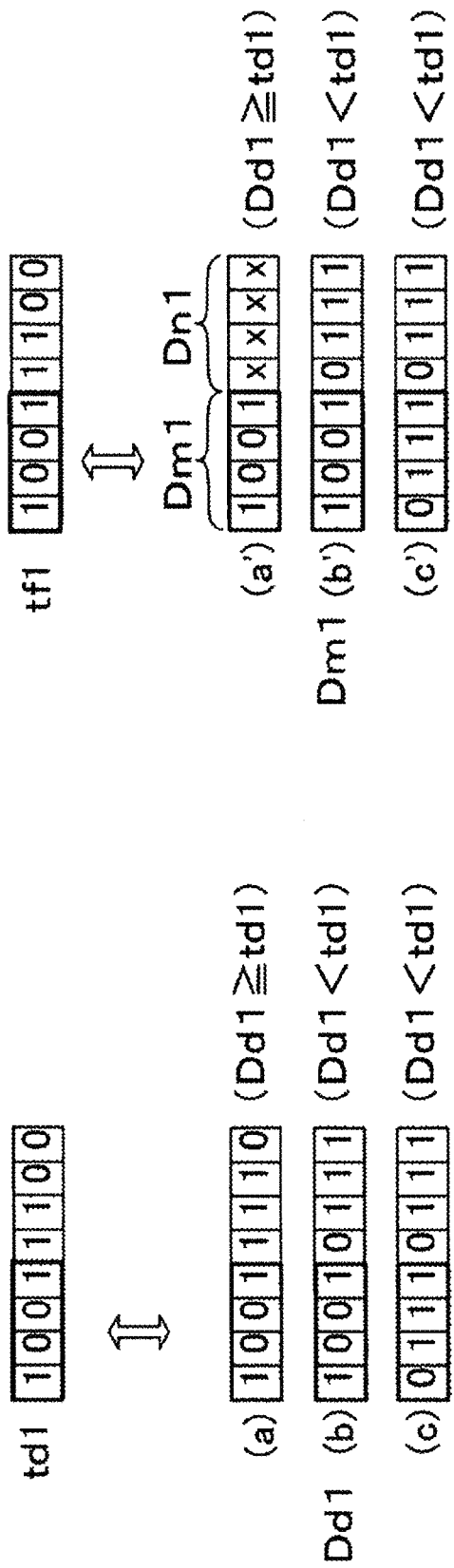
FIG. 28 are diagrams for explaining a switchable threshold value of the encoding parameter.

FIG. 28 are diagrams for explaining values to be set for the switching threshold values $t_{d1}$ for the encoding parameter, in the case where the dynamic-range data $D_{d1}$ is switched to 8 or 4 bits. In an example shown in FIG. 28, the lower 4 bits of the switching threshold value $t_{d1}$ is set to be non-zero. In the case shown in FIG. 28, since the dynamic range data $D_{d1}$ indicated by '(a)' is greater than the switching threshold value $t_{d1}$ ($D_{d1} > t_{d1}$), the lower 4 bits are dropped, and since the dynamic range data $D_{d1}$ indicated by '(b)' or '(c)' is smaller than the switching threshold value $t_{d1}$ ($D_{d1} < t_{d1}$), the lower bits of them are not dropped. In the example shown in FIG. 28, since the lower 4 bits of the switching threshold value $t_{d1}$ are set to be non-zero, the result of comparison between the quantization-dynamic-range data $D_{m1}$ of which lower 4 bits are dropped indicated by '(a')' with the discrimination-threshold value $t_{f1}$ can not be obtained. Therefore, it becomes impossible to discriminate the encoding parameter $p_{d1}$ in the decoder 6 and 7.

Figure 29:
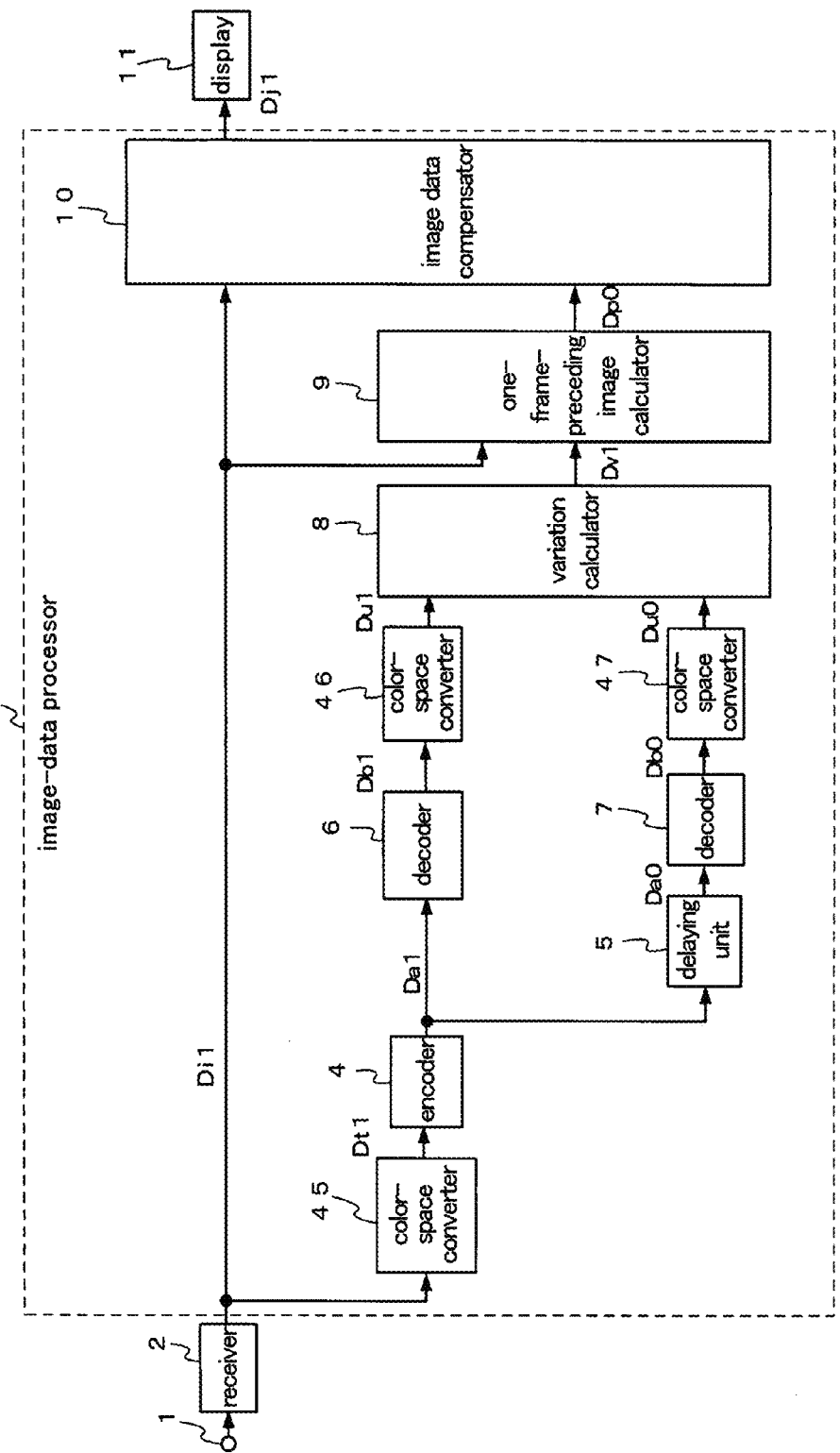
FIG. 29 is a block diagram illustrating a configuration of an image processor of Embodiment 3.

As shown in FIG. 27 and FIG. 29, a value of the switching threshold values $t_{d1}$ is determined depending on the number of bits for quantizing the dynamic range data $D_{d1}$. That is, when the dynamic range data $D_{d1}$ is quantized by dropping its lower n bits, the lower n bits of the switching threshold values $t_{d1}$ are set to be zero. As described above, by setting the switching threshold value $t_{d1}$ depending on the number of bits to be dropped, the encoding parameter can be discriminated in decoding without additional discrimination data even when the dynamic range data $D_{d1}$ is quantized. It becomes possible to discriminate the encoding parameter in the decoders 6 and 7.

In the image processor according to the embodiment explained above, the number of bits for quantizing the dynamic range data $D_{d1}$ and the average data $D_{e1}$ are increased when the number of bits for quantizing the block image data $D_{c1}$ is increased, and the numbers of bits for quantizing the dynamic range data $D_{d1}$ and the average data $D_{e1}$ are reduced when the number of bits for quantizing the block image data $D_{c1}$ is reduced. As a result, the influence of the error caused by encoding can be reduced and the amount of the encoded data can be kept constant as well.

Embodiment 3.

FIG. 29 is a block diagram illustrating another configuration of a liquid crystal display device provided with the image processor according to the present invention. In an image processor 44 according to the embodiment, color converters 45, 46, and 47 are provided in front of an encoder 4 and at the back of decoders 6 and 7. The color-space converter encoder 45 converts current image data $D_{i1}$, into image data that includes a brightness signal Y and color signals $C_b$ and $C_r$, to output the converted current image data $D_{t1}$. The encoder 4 quantizes the current image data $D_{t1}$, and outputs the encoded image data $D_{a1}$ corresponding to the current image data $D_{t1}$. A delaying unit 5 delays the encoded image data $D_{a1}$ by a period equivalent to one frame, and outputs encoded image data $D_{a0}$ corresponding to an image preceding the current image by one frame. The decoders 6 and 7 decode the encoded image data $D_{a1}$ and $D_{a0}$ and output decoded image data $D_{b1}$ and $D_{b0}$ corresponding to the current image.

The color-space converter encoder 46 and 47 convert the encoded current image data $D_{b1}$ and $D_{b0}$, that include the brightness signals and the color signals, into digital RGB signals to output converted image data $D_{u1}$ and $D_{u0}$.

A variation calculator 8 calculates a gray-scale-value variation $D_{v1}$ from the one-frame-preceding image to the current image on a pixel basis by subtracting the decoded image data $D_{b1}$ corresponding to the current-frame image data from the decoded image data $D_{b0}$ corresponding to image data preceding by one frame. The variation $D_{v1}$ is inputted into a one-frame-preceding image calculator 9 together with the current image data $D_{i1}$.

The one-frame-preceding image calculator 9 adds to the current image data $D_{i1}$, the gray-scale-value variation $D_{v1}$ outputted from the variation calculator 8 so as to produce one-frame-preceding image data $D_{q0}$. The one-frame-preceding image data $D_{q0}$ is inputted into an image-data compensator 10.

The image-data compensator 10 corrects the image data $D_{i1}$ on the basis of the grey-scale-value variation obtained from the comparison between the current image data $D_{i1}$ and the one-frame-preceding image data $D_{q0}$ so that transmittance of the liquid crystal reaches a predetermined value specified by the image data $D_{i1}$ within one frame period, and outputs corrected image data $D_{j1}$.

Similarly to Embodiment 2, the encoder 4 according to the embodiment divides the current image data $D_{t1}$ into blocks and generates the block image data $D_{c1}$ the dynamic-range data $D_{d1}$, the average data $D_{e1}$ obtained by quantizing image data $D_{i1}$, the quantization-dynamic-range data $D_{m1}$, and the quantization average data $D_{n1}$. The block image data $D_{c1}$, the dynamic-rage data $D_{d1}$, and the average data $D_{e1}$ are produced for each of the brightness signal Y and the color signals $C_b$ and $C_r$.

Figure 30:
FIG. 30 are diagrams illustrating data structures of encoded image data.

FIG. 30 are diagrams illustrating examples of the quantization image data $D_{j1}$, the quantization-dynamic-range data $D_{m1}$, and the quantization average data $D_{n1}$, in the case where 8 pixels are included in one block of the brightness signal Y and the color signals $C_b$ and $C_r$. In FIG. 30A, each pixel data of the quantization image data $D_{j1}$ of the brightness signal Y and the color signals $C_b$ and $C_r$ is 2 bits, and both the dynamic-range data $D_{m1}$ and the quantization average data $D_{n1}$ are 8 bits. In FIG. 30B, each pixel data of the quantization image data $D_{j1}$ of the brightness signal Y is 4 bits, the quantization-dynamic-range data $D_{m1}$ and the quantization-average data $D_1$ are 8 bits, each pixel data of the color signals $C_b$ and $C_r$ is 1 bit, the dynamic-range data $D_{m1}$ and the quantization average data $D_1$ are 8 bits. In FIG. 30B, the number of bits to quantize the brightness signal Y in the quantization image data $D_{j1}$ is increased by a same bit number which is reduced from the numbers of bits to quantize the quantization image data $D_{j1}$ of the color signals $C_b$ and $C_r$. Accordingly, the amount of one block data shown in FIG. 30A and FIG. 30B are same.

When the dynamic ranges of the color signals $C_b$ and $C_r$ are small and the dynamic range of the brightness signal Y is large, an error caused by encoding the color signals $C_b$ and $C_r$ become small and an error caused by encoding the brightness signal Y become large. Thus, the encoding efficiency can be enhanced by adjusting the numbers of bits for the quantization depending on the dynamic ranges of the color signals $C_b$ and $C_r$ and the brightness signal Y.

The encoder 4 according to the embodiment reduce the numbers of bits for quantizing the color signals $C_b$ and $C_r$ in the quantization image data $D_{j1}$ as shown in FIG. 30B, and increase the number of bits for quantizing the brightness signal Y in the quantization image data $D_{j1}$, in the case where the dynamic ranges of the color signals $C_b$ and $C_r$ are small and the dynamic range of the brightness signal Y is large. In other case, the numbers of bits for quantizing the color signals $C_b$ and $C_r$ and the brightness signal Y in the quantization image data $D_{j1}$ are set equal, as shown in FIG. 30A.

Thus, when the dynamic range of the brightness signal Y is large and the dynamic ranges of the color signals $C_b$ and $C_r$ are small, the number of bits to quantize the brightness signal Y in the quantization image data $D_{j1}$ is decreased and the numbers of bits to quantize the color signals $C_b$ and $C_r$ in the quantization image data $D_{j1}$ are reduced. Therefore, the overall error caused by quantization can be reduced and the amount of encoding can be kept constant as well.

Figure 31:
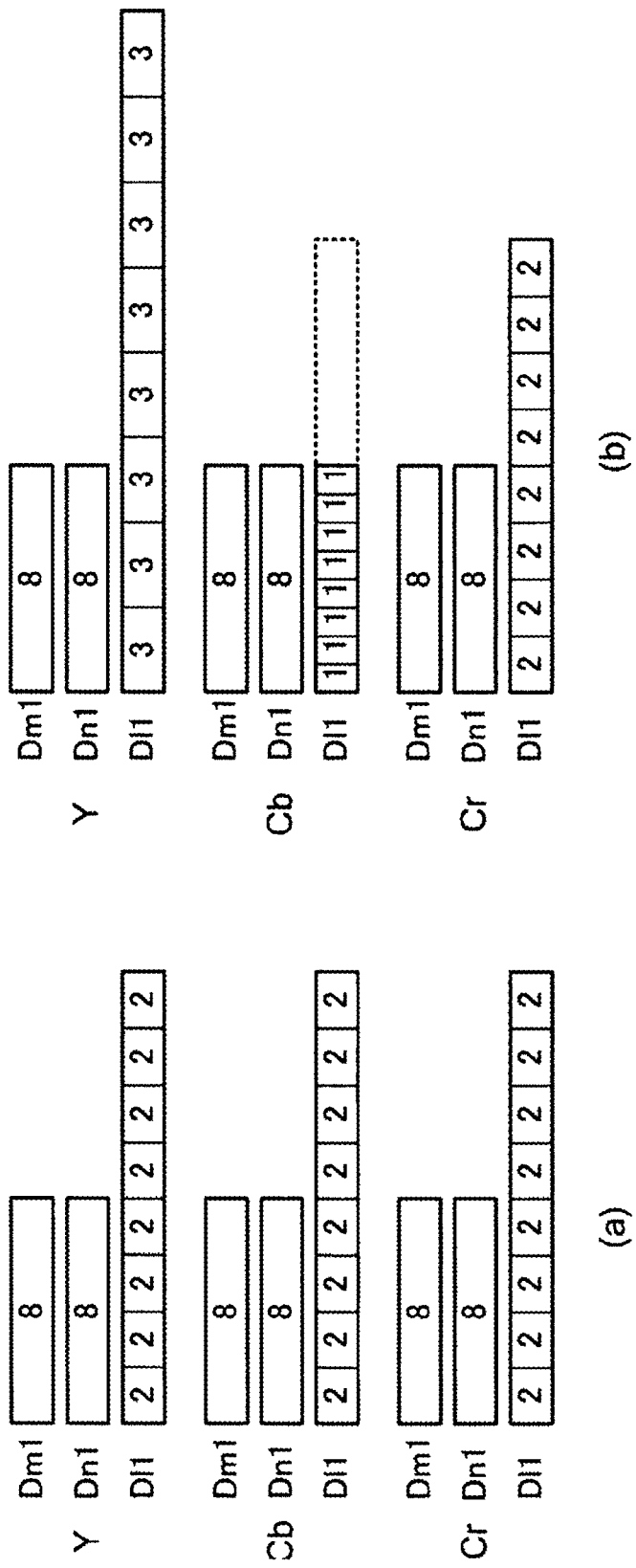
FIG. 31 are diagrams illustrating data structures of encoded image data.

FIG. 31 are diagrams illustrating another example of the quantization image data $D_{j1}$, the quantization-dynamic-range data $D_{m1}$, and the quantization average data $D_{n1}$. FIG. 31A shows a case in which the brightness signal Y and the color signals $C_b$ and $C_r$, for each pixel data in the quantization image data $D_{j1}$ are 2 bits and the quantization-dynamic-range data $D_{j1}$ are 2 bits and the quantization-dynamic-range data $D_{m1}$ and the quantization average data $D_{n1}$ are 8 bits.

FIG. 31B shows a case in which each pixel data of the quantization image data $D_{n1}$ of the brightness signal Y is 3 bits, the quantization-dynamic-range data $D_{m1}$ and the quantization-average data $D_{n1}$ are 8 bits, each pixel data of the color signal $C_b$ is 1 bit, the quantization-dynamic-range data $D_{m1}$ and the quantization average data $D_{n1}$ are 8 bits, and each pixel data of the color signal $C_r$ is 2 bits, the quantization-dynamic-range data $D_{m1}$ and the quantization average data $D_1$ are 8 bits. Since in FIG. 31B, the number of bits to quantize the brightness signal Y in the quantization image data $D_{j1}$ is increased by a same bit number which is reduced from the number of bits to quantize the quantization image data $D_{j1}$, of the color signal $C_b$. Accordingly, the amount of one block data shown in FIG. 31A and FIG. 31B are same.

As shown in FIG. 31, when the numbers of bits for quantizing both the brightness signal Y and the color signals $C_b$ and $C_r$ are adjusted depending on their dynamic ranges, quantization image data $D_n$ of the color signals $C_b$ and $C_r$ may be controlled adaptively. That is, as long as the amount of the one block data is kept constant, the numbers of bits of the quantization image data $D_{j1}$ of the brightness signal Y and the color signals $C_b$ and $C_r$ may be set any number.

According to an image processor of the embodiment explained above, the processor converts the current image data $D_{t1}$ into the current image data $D_{t1}$ including the brightness signal Y and the color signals $C_b$ and $C_r$. When the dynamic range of the brightness signal Y is large and the dynamic ranges of the color signals $C_b$ and $C_r$ are small, the number of bits of the quantization image data $D_{j1}$ of the brightness signal Y having large errors caused by quantization is increased, and the numbers of bits of the quantization image data $D_{j1}$ of the color signals $C_b$ and $C_r$ having small errors caused by quantization is reduced. Therefore, the overall error caused by quantization can be reduced and the amount of encoding can be kept constant as well.

What is claimed is:

1. An image encoder, comprising:
    an image-data dividing unit for dividing image data into image data blocks and outputting the image data of each image data block;
    a dynamic range producing unit for detecting a dynamic range of the image data of each data block and outputting dynamic range data for each image data block;
    an average calculating unit for calculating a value representing the average value of the image data of each image data block and outputting average data for each image data block based on the calculated value;
    a quantizing unit for quantizing the image data of each image data block, using a quantization threshold value previously determined by the corresponding dynamic range data and the corresponding average data, and outputting quantization image data for each image data block;
    a data quantizing unit for quantizing the dynamic range data and the average data for each image data block, and outputting quantization dynamic range data and quantization average data, respectively, for each image data block; and
    an encoded data combining unit for generating encoded image data corresponding to the image data of each image data block, by combining bit data from the corresponding quantization image data, the corresponding quantization dynamic range data, and the corresponding quantization average data, respectively, wherein the quantizing unit adjusts the number of bits for quantizing the image data of each image data block, depending on the corresponding dynamic range data, and wherein the data quantizing unit changes the numbers of bits for quantizing the dynamic range data and the average data, depending on the change in the number of bits for quantizing the image data of the corresponding image data block, so as to keep constant the total number of bits of the encoded image data comprising the quantization image data, the quantization average data, and the quantization dynamic range data for each image data block.

2. An image encoder according to claim 1, wherein the encoded image data have the dynamic range data at its head.

3. An image encoding method, comprising the steps of:
dividing image data into image data blocks and outputting the image data of each image data block;
detecting a dynamic range of the image data of each image data block and outputting dynamic range data for each image data block;
calculating a value representing the average value of the image data of each image data block and outputting average data for each image data block based on the calculated value;
quantizing the image data of each image data block, using a quantization threshold value previously determined by the dynamic range data and the average data, and outputting quantization image data for each image data block;
quantizing the dynamic range data and the average data for each image data block, and outputting quantization dynamic range data and quantization average data, respectively, for each image data block; and
generating encoded image data corresponding to the image data of each image data block, by combining bit data from the corresponding quantization image data, the corresponding quantization dynamic range data, and the corresponding quantization average data, respectively,
wherein the number of bits for quantizing the image data of each image data block is adjusted depending on the corresponding dynamic range data, and
wherein the numbers of bits for quantizing the dynamic range data and the average data are adjusted, depending on the change in the number of bits for quantizing the image data of the corresponding image data block, so as to keep constant the total number of bits of the encoded image data comprising the quantization image data, the quantization average data, and the quantization dynamic range data for each image data block.

4. An image encoding method according to claim 3, wherein the encoded image has the dynamic range data at its head.

* * * * *